United States Patent
Abdoli et al.

(10) Patent No.: US 11,039,429 B2
(45) Date of Patent: Jun. 15, 2021

(54) METHOD AND APPARATUS FOR DOWNLINK CONTROL INFORMATION COMMUNICATION AND INTERPRETATION

(71) Applicant: Huawei Technologies Co., Ltd., Shenzhen (CN)

(72) Inventors: Javad Abdoli, Kanata (CA); Zhenfei Tang, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/216,191

(22) Filed: Dec. 11, 2018

(65) Prior Publication Data

US 2019/0313377 A1    Oct. 10, 2019

Related U.S. Application Data

(60) Provisional application No. 62/652,490, filed on Apr. 4, 2018.

(51) Int. Cl.
| | | |
|---|---|---|
| *H04W 72/04* | (2009.01) |
| *H04L 1/00* | (2006.01) |
| *H04L 5/00* | (2006.01) |
| *H04W 88/06* | (2009.01) |
| *H04L 27/26* | (2006.01) |

(52) U.S. Cl.
CPC ......... *H04W 72/042* (2013.01); *H04L 1/0071* (2013.01); *H04L 5/0053* (2013.01); *H04L 27/2614* (2013.01); *H04W 72/0446* (2013.01); *H04W 72/0453* (2013.01); *H04W 88/06* (2013.01); *H04L 5/0007* (2013.01)

(58) Field of Classification Search
CPC ... H04L 5/0053; H04L 5/0044; H04L 5/0094; H04W 28/06; H04W 72/042; H04W 72/0446; H04W 72/0453; H04W 72/1263; H04W 72/1289; H04W 72/0413; H04W 72/048; H04W 72/1284

See application file for complete search history.

(56) References Cited

U.S. PATENT DOCUMENTS

| | | |
|---|---|---|
| 2017/0257860 A1 | 9/2017 | Nam et al. |
| 2017/0367046 A1 | 12/2017 | Papasakellariou |
| 2018/0049203 A1* | 2/2018 | Xue ............ H04L 5/0035 |
| 2018/0359755 A1 | 12/2018 | Sun et al. |
| 2019/0020506 A1 | 1/2019 | Cheng et al. |
| 2019/0082431 A1 | 3/2019 | Yi et al. |

(Continued)

FOREIGN PATENT DOCUMENTS

CN    107659994 A    2/2018

OTHER PUBLICATIONS

Catt, "Remaining aspects of BWP Operation", 3GPP TSG WG1 Meeting #90bis, R1-1717839, Oct. 9-13, 2017, 4 Pages, Prague, Czechia.

(Continued)

*Primary Examiner* — Jung Liu
(74) *Attorney, Agent, or Firm* — Slater Matsil, LLP

(57) ABSTRACT

Methods and apparatus are provided for wireless communication in which a downlink control information (DCI) is transmitted in a physical downlink control channel (PDCCH) in a first bandwidth part (BWP). A UE is responsible for determining a starting resource block (RB) for a data transmission allocated by the DCI based on a value of a frequency domain resource allocation field in the DCI, a reference RB, and a reference size of a second BWP. The data transmission can then be transmitted, in the case of, for example, PUSCH, by a UE or received, in the case of, for example, PDSCH.

19 Claims, 12 Drawing Sheets

(56) References Cited

U.S. PATENT DOCUMENTS

| | | | |
|---|---|---|---|
| 2019/0103941 A1 | 4/2019 | Seo et al. | |
| 2019/0158205 A1 | 5/2019 | Sheng et al. | |
| 2019/0158326 A1 | 5/2019 | Liao et al. | |
| 2019/0199477 A1* | 6/2019 | Park | H04L 5/0055 |
| 2019/0200332 A1* | 6/2019 | Hwang | H04L 5/00 |
| 2019/0200345 A1* | 6/2019 | Zhang | H04L 5/0044 |
| 2019/0215896 A1 | 7/2019 | Zhou et al. | |
| 2019/0222404 A1* | 7/2019 | Ang | H04L 5/0048 |
| 2019/0253986 A1 | 8/2019 | Jeon et al. | |
| 2019/0261356 A1* | 8/2019 | Myung | H04W 72/0413 |
| 2019/0261405 A1* | 8/2019 | Ang | H04L 5/0053 |
| 2019/0297577 A1 | 9/2019 | Lin et al. | |
| 2019/0297605 A1* | 9/2019 | Kim | H04L 5/0053 |
| 2019/0306847 A1* | 10/2019 | Seo | H04W 72/042 |
| 2019/0364602 A1* | 11/2019 | Yi | H04W 74/0833 |

OTHER PUBLICATIONS

Nokia, "DraftCR to 38.214 capturing the Jan. 18, ad-hoc meeting agreements", 3GPP TSG RAN WG1 Meeting AH 1801, R1-1801286, Jan. 22-26, 2018, 2 Pages, Vancouver, Canada.

3GPP TS 38.211 V15.1.0 (Mar. 2018); 3rd Generation Partnership Project; Technical Specification Group Radio Access Network; NR; Physical channels and modulation (Release 15), 87 pages.

3GPP TS 38.212 V15.1.0 (Mar. 2018); 3rd Generation Partnership Project; Technical Specification Group Radio Access Network; NR; Multiplexing and channel coding (Release 15), 90 pages.

3GPP TSG RAN WG1 Meeting #92; Athens, Greece, Feburary 26-Mar. 2, 2018; RAN1 Chairman's Notes, 152 pages.

3GPP TSG RAN WG1 Meeting AH 1801; Vancouver, Canada, Jan. 22-26, 2018; RAN1 Chairman's Notes, 97 pages.

Asustek, "Discussion about number of DCI format size", 3GPP TSG-RAN WG1 Meeting #92bis, R1-1804033, Apr. 16-20, 2018, 3 Pages, Sanya, China.

ITRI, "Discussion on DCI format 0-0/0-1", 3GPP TSG RAN WG1 Meeting #92bis, R1-1803965, Apr. 16-20, 2018, 8 Pages, Sanya, China.

LG Electronics, "Remaining details on search space", 3GPP TSG RAN WG1 Meeting 91, R1-1719918, Nov. 27-Dec. 1, 2017, 4 Pages, Reno, USA.

* cited by examiner

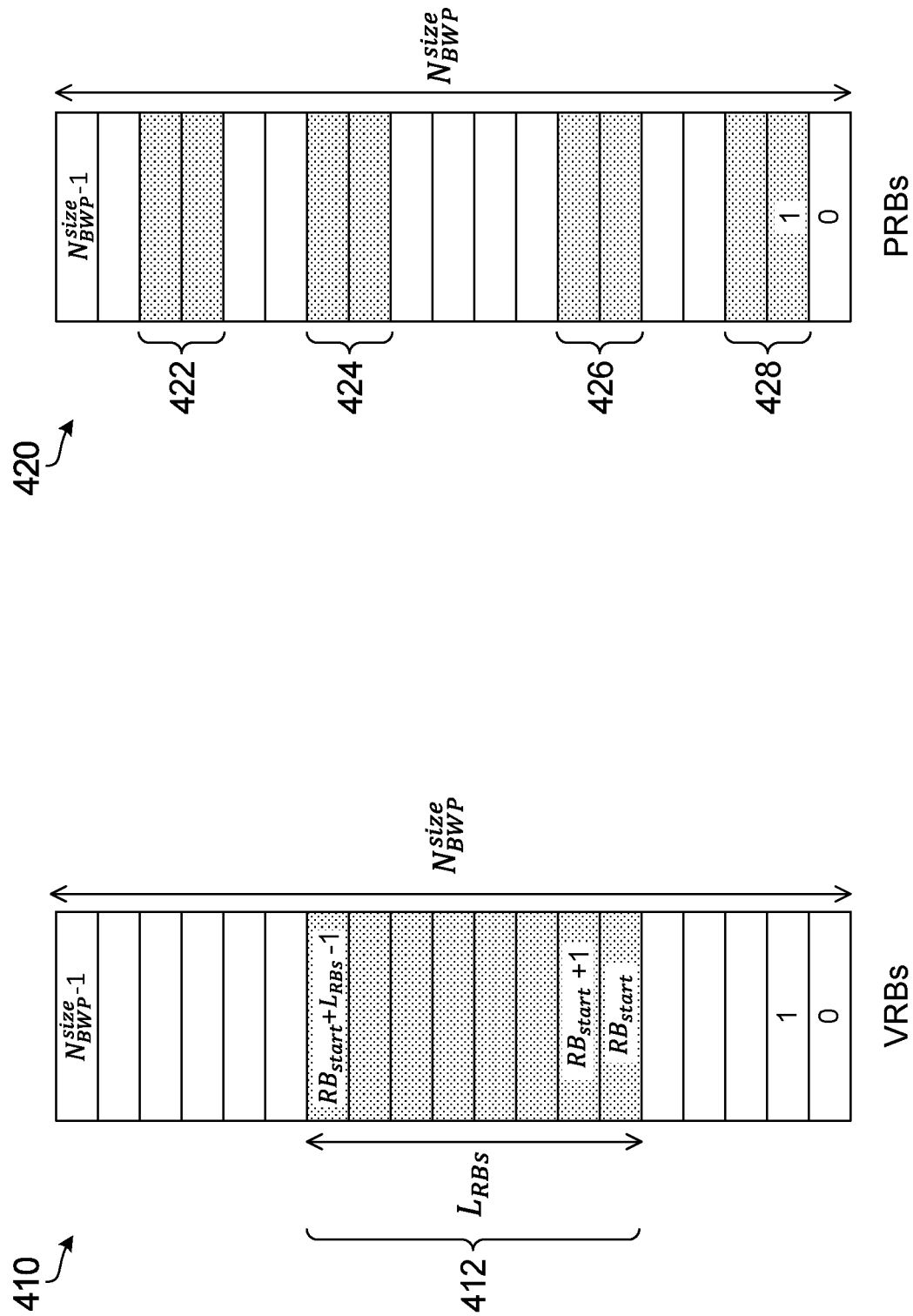

METHOD AND APPARATUS FOR DOWNLINK CONTROL INFORMATION COMMUNICATION AND INTERPRETATION

CROSS REFERENCE TO RELATED APPLICATIONS

This application claims the benefit of priority to U.S. Provisional Patent Application Ser. No. 62/652,490 filed Apr. 4, 2018 and entitled "Method and Apparatus for Downlink Control Information Communication and Interpretation" the contents of which are incorporated herein by reference.

TECHNICAL FIELD

The present invention relates generally to a system and method for wireless communications, and, in particular embodiments, to a system and method for determining a location of a transmission resource allocated in a Downlink Control Information (DCI).

BACKGROUND

An air interface is the wireless communications link between two or more communicating devices, such as a radio access network device (e.g., a base station, a NodeB, an evolved NodeB, a transmit point) and an electronic device (ED) (e.g., a user equipment (UE), a mobile phone, a sensor, a camera). Typically, both communicating devices need to know specific parameters of the air interface in order to successfully transmit and receive a transmission.

Configuring the communicating devices with the same air interface parameters allows the communicating devices to reliably identify, organize and use physical resources, such as time, frequency, or time and frequency resources. Therefore, in current wireless communications systems, transmissions are typically communicated in accordance with one pre-defined configuration for the air interface.

Modern wireless networks, however, are increasingly used to support communications of diverse traffic types, which may have different characteristics and quality of service (QoS) requirements, such as latency, throughput, and simultaneous connections. Consequently, the different traffic types of modern wireless networks are not well-suited for a one-size-fits-all air interface configuration.

In cellular communications such as New Radio (NR), downlink control information (DCI) is transmitted through a physical downlink control channel (PDCCH) from the radio access network device to the ED to provide the ED with information about specific physical layer parameters such as scheduling of downlink or uplink data, and other configuration parameters.

An ED is configured with one or more bandwidth parts (BWPs) within the carrier bandwidth. Each BWP consists of a number of contiguous resource blocks (RBs) within the carrier. In certain scenarios, only one of the configured BWPs is active for the ED at a given time instant. In other scenarios, more than one of the configured BWPs are simultaneously active for the ED.

An ED is configured with a number of control resource sets (CORESETs) in each of the ED's configured BWPs, each CORESET being a set of physical time and frequency resources for possible transmission of PDCCH. A number of search spaces are configured and associated to each CORESET. Each search space associated with a CORESET corresponds to a number of subsets of resources in the CORESET, each subset corresponding to a PDCCH candidate.

The ED reads the information in the DCI via a process known as "blind decoding". The location of the PDCCH containing the DCI, in physical time and frequency transmission resources, is not previously known to the ED. Therefore, the ED must "blindly" search for the PDCCH in a designated area of physical time and frequency resources (the aforementioned resource subsets in a search space) by making repeated attempts to decode PDCCH candidates in the search space.

For each PDCCH candidate, the ED may need to try different decoding parameters to decode the DCI. For example, DCIs can be transmitted with different payload sizes. For a given PDCCH candidate, different DCI payload sizes may result in different encoding/decoding code rates. The ED can only decode the candidate DCI if the ED has used the correct payload size. In practice, the ED cannot realistically try an infinite number of different combinations of DCI payload sizes during blind decoding due to time and processing constraints. In cellular communications such as New Radio (NR), for example, the ED may be restricted to only attempting a few (e.g., four in total per slot) different DCI payload sizes during blind decoding.

In certain scenarios, the ED may be configured in an active BWP of the carrier bandwidth to try to decode a DCI whose payload size is based on another bandwidth part of the carrier bandwidth. In this case however, the contents of the DCI may be unclear to the ED, or subject to misinterpretation, because a DCI field, the size of which is based on a BWP (of size1), needs to be interpreted to schedule data in another BWP (of size2), where size2≠size1.

SUMMARY

Technical advantages are generally achieved by embodiments of this disclosure which describe a system and method for determining a location of a transmission resource allocated in a Downlink Control Information (DCI). Examples of technical benefits may include efficient resource utilization for common DCI and common data as a group of UEs can access the same physical downlink shared channel (PDSCH) or physical uplink shared channel (PUSCH) location with the same DCI transmission.

According to an aspect of the disclosure there is provided a method for wireless communication. The method includes: receiving, by a user equipment (UE), a downlink control information (DCI) in a physical downlink control channel (PDCCH) in an active downlink (DL) bandwidth part (BWP), the DCI for scheduling a data transmission, and the DCI comprising a frequency domain resource allocation field; and receiving, by the UE, the data transmission in a time-frequency resource defined at least by a starting resource block (RB) and a length of contiguously allocated RBs, the starting RB based on: a value of the frequency domain resource allocation field in the DCI, a reference RB, and a number of RBs of a first control resource set (CORESET), and the length of contiguously allocated RBs based on: the value of the frequency domain resource allocation field in the DCI and the number of RBs of the first CORESET.

In some embodiments, the reference RB is a lowest-numbered physical resource block (PRB) in a second CORESET, and wherein the second CORESET is a CORESET where the DCI has been decoded by the UE.

In some embodiments, the method further involves, determining, by the UE, that the DCI is a fallback DCI for the data transmission with a non-interleaved VRB-to-PRB mapping, the fallback DCI is decoded in a common search space, and for the data transmission, a virtual RB n is mapped to a PRB $n+n_{CORESET}^{start}$, where a PRB $n_{CORESET}^{start}$ is the lowest-numbered PRB in the CORESET where the fallback DCI has been decoded by the UE.

In some embodiments, the active DL BWP involves a distribution of RBs for the data transmission based on an interleave mapping of bundles of virtual RBs to interleaved bundles of physical RBs, wherein the starting RB is a virtual starting RB and the length of contiguously allocated RBs is a length of contiguously allocated virtual RBs, and wherein the virtual starting RB defines a start of the length of contiguously allocated virtual RBs.

In some embodiments, receiving the data transmission involves receiving the data transmission in a time-frequency resource defined by the interleaved bundles of physical RBs, the interleaved bundles of physical RBs based on: the virtual starting RB, the length of contiguously allocated virtual RBs, the interleave mapping, and a reference bundle of physical RBs.

In some embodiments, the reference bundle of physical RBs is a bundle of physical RBs that contains a lowest-numbered physical resource block (PRB) in a second CORESET, and wherein the second CORESET is a CORESET where the DCI has been decoded by the UE.

In some embodiments, the DCI is a fallback DCI.

In some embodiments, the first CORESET is associated with a CORESET identifier of "0".

In some embodiments, the DCI is associated with a group of UEs, and the data transmission scheduled by the DCI is a downlink data transmission allocated in the same time-frequency resource for all UEs in the group of UEs.

According to another aspect of the disclosure there is provided a user equipment (UE) including a processor and a computer-readable medium having stored thereon computer-executable instructions. When the instructions are executed by the processor, they cause the UE to: receive, by the UE, a downlink control information (DCI) in a physical downlink control channel (PDCCH) in an active downlink (DL) bandwidth part (BWP), the DCI for scheduling a data transmission, and the DCI comprising a frequency domain resource allocation field; and receive, by the UE, the data transmission in a time-frequency resource defined at least by a starting resource block (RB) and a length of contiguously allocated RBs, the starting RB based on: a value of the frequency domain resource allocation field in the DCI, a reference RB, and a number of RBs of a first control resource set (CORESET), and the length of contiguously allocated RBs based on: the value of the frequency domain resource allocation field in the DCI and the number of RBs of the first CORESET.

In some embodiments, the reference RB is a lowest-numbered physical resource block (PRB) in a second CORESET, and wherein the second CORESET is a CORESET where the DCI has been decoded by the UE.

In some embodiments, the computer-executable instructions, when executed by the processor, further cause the UE to: determine that: the DCI is a fallback DCI for the data transmission with a non-interleaved VRB-to-PRB mapping; the fallback DCI is decoded in a common search space, and for the data transmission, a virtual RB n is mapped to a PRB $n+n_{CORESET}^{start}$, where a PRB $n_{CORESET}^{start}$ is the lowest-numbered PRB in the CORESET where the fallback DCI has been decoded by the UE.

In some embodiments, the active DL BWP involves a distribution of RBs for the data transmission based on an interleave mapping of bundles of virtual RBs to interleaved bundles of physical RBs, wherein the starting RB is a virtual starting RB and the length of contiguously allocated RBs is a length of contiguously allocated virtual RBs, and wherein the virtual starting RB defines a start of the length of contiguously allocated virtual RBs.

In some embodiments, the computer-executable instructions that cause the UE to receive the data transmission cause the UE to receive the transmission in a time-frequency resource defined by the interleaved bundles of physical RBs, the interleaved bundles of physical RBs based on: the virtual starting RB, the length of contiguously allocated virtual RBs, the interleave mapping, and a reference bundle of physical RBs.

In some embodiments, the reference bundle of physical RBs is a bundle of physical RBs that contains a lowest-numbered physical resource block (PRB) in a second CORESET, and wherein the second CORESET is a CORESET where the DCI has been decoded by the UE.

In some embodiments, the DCI is a fallback DCI.

In some embodiments, the first CORESET is associated with a CORESET identifier of "0".

In some embodiments, the DCI is associated with a group of UEs, and the data transmission scheduled by the DCI is a downlink data transmission allocated in the same time-frequency resource for all UEs in the group of UEs.

According to yet another aspect of the disclosure there is provided a method for wireless communication. The method includes: transmitting, by a base station, a downlink control information (DCI) in a physical downlink control channel (PDCCH) in an active downlink (DL) bandwidth part (BWP), the DCI for scheduling a data transmission, and the DCI comprising a frequency domain resource allocation field; and transmitting, by the base station to a user equipment (UE), the data transmission in a time-frequency resource defined at least by a starting resource block (RB) and a length of contiguously allocated RBs, the starting RB based on: a value of the frequency domain resource allocation field in the DCI, a reference RB, and a number of RBs of a first control resource set (CORESET), and the length of contiguously allocated RBs based on: the value of the frequency domain resource allocation field in the DCI and the number of RBs of the first CORESET.

In some embodiments, the reference RB is a lowest-numbered physical resource block (PRB) in a second CORESET, and wherein the second CORESET is a CORESET where the DCI has been decoded by the UE.

In some embodiments, the active DL BWP involves a distribution of RBs for the data transmission based on an interleave mapping of bundles of virtual RBs to interleaved bundles of physical RBs, wherein the starting RB is a virtual starting RB and the length of contiguously allocated RBs is a length of contiguously allocated virtual RBs, and wherein the virtual starting RB defines a start of the length of contiguously allocated virtual RBs.

In some embodiments, transmitting the data transmission involves transmitting the data transmission in a time-frequency resource defined by the interleaved bundles of physical RBs, the interleaved bundles of physical RBs based on: the virtual starting RB, the length of contiguously allocated virtual RBs, the interleave mapping, and a reference bundle of physical RBs.

In some embodiments, the reference bundle of physical RBs is a bundle of physical RBs that contains a lowest-numbered physical resource block (PRB) in a second CORESET, and wherein the second CORESET is a CORESET where the DCI has been decoded by the UE.

In some embodiments, the DCI is a fallback DCI.

In some embodiments, the first CORESET is associated with a CORESET identifier of "0".

In some embodiments, the DCI is associated with a group of UEs, and the data transmission scheduled by the DCI is a downlink data transmission allocated in the same time-frequency resource for all UEs in the group of UEs.

According to still another aspect of the disclosure there is provided a device including a processor and a computer-readable medium having stored thereon computer-executable instructions. When executed by the processor, the instructions cause the device to: transmit, a downlink control information (DCI) in a physical downlink control channel (PDCCH) in an active downlink (DL) bandwidth part (BWP), the DCI for scheduling a data transmission, and the DCI comprising a frequency domain resource allocation field; and transmit to a user equipment (UE), the data transmission in a time-frequency resource defined at least by a starting resource block (RB) and a length of contiguously allocated RBs, the starting RB based on: a value of the frequency domain resource allocation field in the DCI, a reference RB, and a number of RBs of a first control resource set (CORESET), and the length of contiguously allocated RBs based on: the value of the frequency domain resource allocation field in the DCI and the number of RBs of the first CORESET.

In some embodiments, the reference RB is a lowest-numbered physical resource block (PRB) in a second CORESET, and wherein the second CORESET is a CORESET where the DCI has been decoded by the UE.

In some embodiments, the active DL BWP involves a distribution of RBs for the data transmission based on an interleave mapping of bundles of virtual RBs to interleaved bundles of physical RBs, wherein the starting RB is a virtual starting RB and the length of contiguously allocated RBs is a length of contiguously allocated virtual RBs, and wherein the virtual starting RB defines a start of the length of contiguously allocated virtual RBs.

In some embodiments, transmitting the data transmission involves transmitting the data transmission in a time-frequency resource defined by the interleaved bundles of physical RBs, the interleaved bundles of physical RBs based on: the virtual starting RB, the length of contiguously allocated virtual RBs, the interleave mapping, and a reference bundle of physical RBs.

In some embodiments, the reference bundle of physical RBs is a bundle of physical RBs that contains a lowest-numbered physical resource block (PRB) in a second CORESET, and wherein the second CORESET is a CORESET where the DCI has been decoded by the UE.

In some embodiments, the DCI is a fallback DCI.

In some embodiments, the first CORESET is associated with a CORESET identifier of "0".

In some embodiments, the DCI is associated with a group of UEs, and the data transmission scheduled by the DCI is a downlink data transmission allocated in the same time-frequency resource for all UEs in the group of UEs.

BRIEF DESCRIPTION OF THE DRAWINGS

For a more complete understanding of the present invention, and the advantages thereof, reference is now made to the following description taken in conjunction with the accompanying drawings, in which:

FIG. 4A is an example of a set of virtual resource blocks (VRBs) including a subset of VRBs scheduled for a particular type of transmission.

FIG. 4B is an example of an interleave mapping of the set of VRBs including the subset of VRBs in FIG. 4A onto a set of physical resource blocks (PRBs).

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
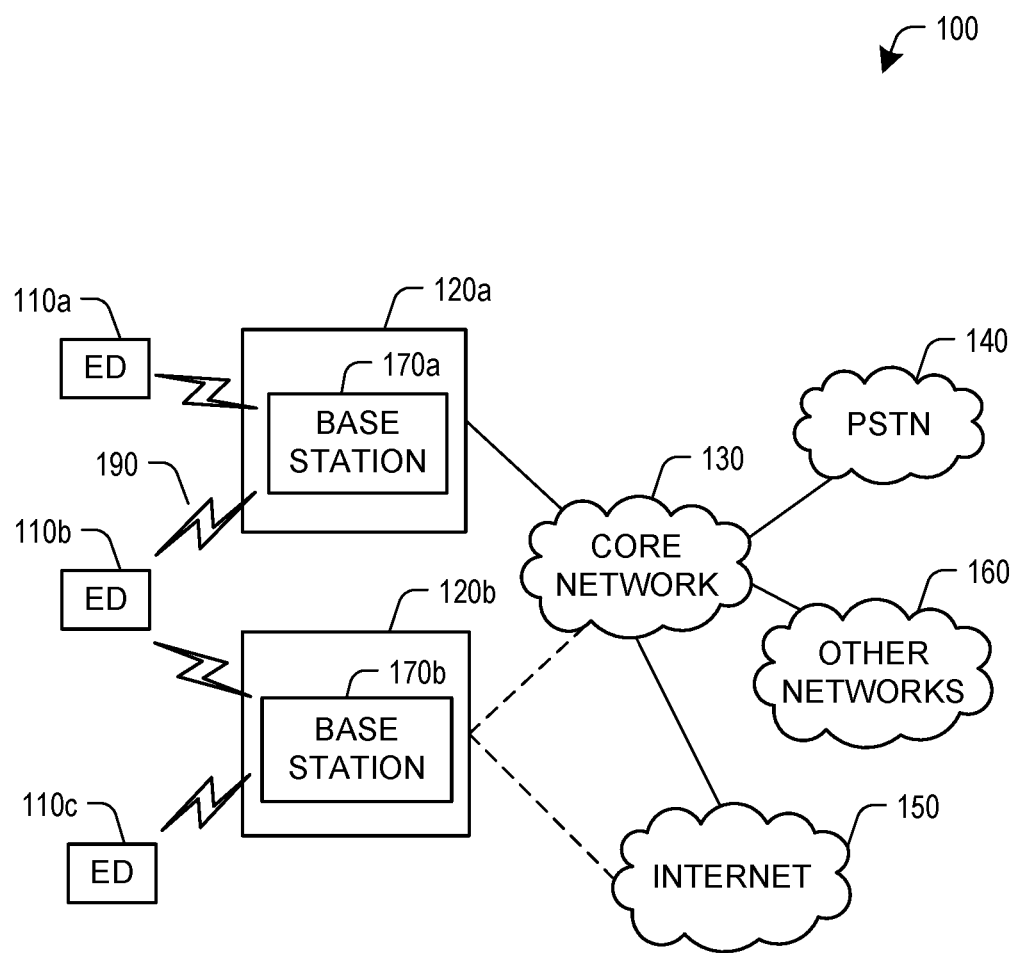
FIG. 1 is a network diagram of a communication system.

FIG. 1 illustrates an example communication system 100 in which embodiments of the present disclosure could be implemented. In general, the communication system 100 enables multiple wireless or wired elements to communicate data and other content. The purpose of the communication system 100 may be to provide content (voice, data, video, text) via broadcast, narrowcast, user device to user device, etc. The communication system 100 may operate by sharing resources such as bandwidth.

In this example, the communication system 100 includes electronic devices (ED) 110a-110c, radio access networks (RANs) 120a-120b, a core network 130, a public switched telephone network (PSTN) 140, the internet 150, and other networks 160. Although certain numbers of these components or elements are shown in FIG. 1, any reasonable number of these components or elements may be included in the communication system 100.

The EDs 110a-110c are configured to operate, communicate, or both, in the communication system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication (MTC) device, personal digital assistant (PDA), smartphone, laptop, computer, tablet, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 110a-110c may be alternatively or additionally configured to interface, access, or communicate with any other base station 170a-170b, the internet 150, the core network 130, the PSTN 140, the other networks 160, or any combination of the preceding. The communication system 100 may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b transmits and/or receives wireless signals within a particular geographic region or area, sometimes referred to as a "cell" or "coverage area". A cell may be further divided into cell sectors, and a base station 170a-170b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 120a-120b shown is exemplary only. Any number of RAN may be contemplated when devising the communication system 100.

The base stations 170a-170b communicate with one or more of the EDs 110a-110c over one or more air interfaces 190 using wireless communication links e.g. radio frequency (RF), microwave, infrared (IR), etc. The air interfaces 190 may utilize any suitable radio access technology. For example, the communication system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as High Speed Packet Access (HSPA), Evolved HPSA (HSPA+) optionally including High Speed Downlink Packet Access (HSDPA), High Speed Packet Uplink Access (HSUPA), or both. Alternatively, a base station 170a-170b may establish an air interface 190 with Evolved UTMS Terrestrial Radio Access (E-UTRA) using Long-Term Evolution (LTE), LTE-A, and/or LTE-B. It is contemplated that the communication system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. The RANs 120a-120b and/or the core network 130 may be in direct or indirect communication with one or more other RANs (not shown), which may or may not be directly served by core network 130, and may or may not employ the same radio access technology as RAN 120a, RAN 120b, or both. The core network 130 may also serve as a gateway access between (i) the RANs 120a-120b or EDs 110a-110c or both, and (ii) other networks (such as the PSTN 140, the internet 150, and the other networks 160). In addition, some or all of the EDs 110a-110c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as internet protocol (IP), transmission control protocol (TCP), user datagram protocol (UDP). EDs 110a-110c may be multimode devices capable of operation according to multiple radio access technologies, and incorporate multiple transceivers necessary to support such.

In embodiments of the present invention, the communications system 100 is a heterogeneous communications system with different transmission source types and/or different transmission destination types. The different transmission source types may have different transmission capabilities. The different transmission destination types may have different reception capabilities.

In the heterogeneous communications system, the EDs 110a-110c of FIG. 1 include different types of devices having different capabilities and requirements. More specifically, each ED 110a-110c may be associated with a different traffic type having particular requirements for Quality of Service (QoS), latency, throughput, simultaneous connections, etc. Example EDs 110a-110c associated with different traffic types may include a smartphone, a computer, a television, a security camera, a sensor, a thermostat, a heart rate monitor, etc. In a particular example, ED 110a is a computer, ED 110*b* is a sensor, and ED 110*c* is a heart rate monitor. Each of the EDs 110*a*-110*c* may have different wireless communication capabilities and requirements.

Furthermore, in a heterogeneous communications system, the base stations 170*a*-170*b* may communicate with one or more of the EDs 110*a*-110*c* over one or more software-configurable air interfaces 190 using wireless communication links. The different radio access network devices (e.g., base stations 170*a*-170*b*) and electronic devices (e.g., ED 110*a*-110*c*) may have different transmission capabilities and/or requirements. As an example, an eNB may have multiple transmit antennas. A picocell may only have one transmit antenna or a relatively small number of transmit antennas. Additionally, a picocell may transmit at a lower maximum power level as compared to an eNB. Similarly, a computer may have much higher data bandwidth requirement and signal processing capability than a sensor. For another example, a heart rate monitor may have much stricter latency and reliability requirements than a television.

Therefore, in a heterogeneous communications system, such as heterogeneous communications system 100, different pairs of communicating devices (i.e., a network device and an electronic device; or a network device and another network device; or an electronic device and another electronic device) may have different transmission capabilities and/or transmission requirements. The different transmission capabilities and/or transmission requirements can be met by the availability to select different air interface configurations for different devices, communications, or requirements.

Figure 2:
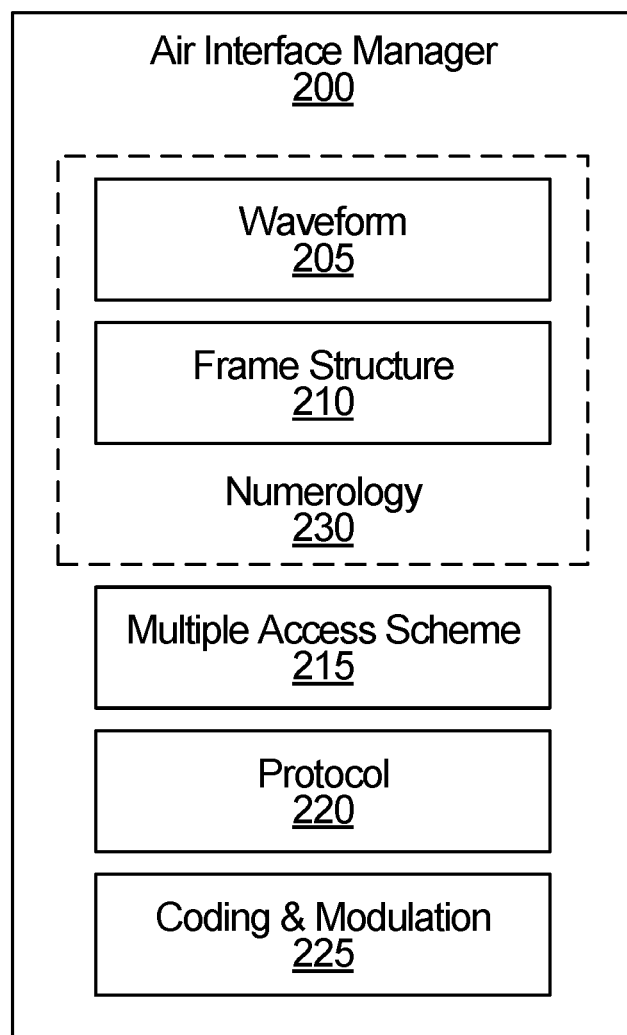
FIG. 2 is a block diagram of an air interface manager for configuring a software-configurable air interface.

FIG. 2 illustrates a schematic diagram of an air interface manager 200 for configuring a software-configurable air interface 190. Air interface manager 200 may be, for example, a module comprising a number of components or building blocks that define the parameters of the air interface 190 and collectively specify how a transmission is to be made and/or received by the air interface 190.

The components of the air interface manger 200 include at least one of a waveform component 205, a frame structure component 210, a multiple access scheme component 215, a protocol component 220, and a coding and modulation component 225.

The waveform component 205 may specify a shape and form of a signal being transmitted. Waveform options may include orthogonal multiple access waveforms and non-orthogonal multiple access waveforms. Non-limiting examples of such waveform options include Orthogonal Frequency Division Multiplexing (OFDM), Filtered OFDM (f-OFDM), Time windowing OFDM, Filter Bank Multicarrier (FBMC), Universal Filtered Multicarrier (UFMC), Generalized Frequency Division Multiplexing (GFDM), Wavelet Packet Modulation (WPM), Faster Than Nyquist (FTN) Waveform, and low Peak to Average Power Ratio Waveform (low PAPR WF).

The frame structure component 210 may specify a configuration of a frame or group of frames. The frame structure component 210 may indicate one or more of a time, frequency, pilot signature, code, or other parameter of the frame or group of frames.

Non-limiting examples of frame structure options include: the number of symbols in the time slot, the number of time slots in the frame and the duration of each time slot (sometimes known as a transmission time interval, TTI, or a transmission time unit, TTU). The frame structure component may also specify whether the time slot is a configurable multi-level TTI, a fixed TTI, or a configurable single-level TTI. The frame structure component may further specify a co-existence mechanism for different frame structure configurations.

For some waveforms, such as certain OFDM-based waveforms, the frame structure component may also specify one or more associated waveform parameters, such as sub-carrier spacing width, symbol duration, cyclic prefix (CP) length, channel bandwidth, guard bands/subcarriers, and sampling size and frequency.

Additionally, the frame structure component 210 may further specify whether the frame structure is used in a time-division duplex communication or a frequency-division duplex communication.

Together, the specifications of the waveform component and the frame structure component are sometimes known as the "numerology." Thus, the air interface 190 may include a numerology component 230 defining a number of air interface configuration parameters, such as the sub-carrier spacing, CP length, symbol length, slot length, and symbols per slot.

These numerologies, also known as subcarrier spacing configurations, may be scalable in the sense that subcarrier spacings of different numerologies are multiples of each other, and time slot lengths of different numerologies are also multiples of each other. Such a scalable design across multiple numerologies provides implementation benefits, for example scalable total OFDM symbol duration in a time division duplex (TDD) context.

Frames can be configured using one or a combination of scalable numerologies. For example, a numerology with 60 kHz subcarrier spacing has a relatively short OFDM symbol duration (because OFDM symbol duration varies inversely with subcarrier spacing), which makes the 60 kHz numerology particularly suitable for ultra-low latency communications, such as Vehicle-to-Any (V2X) communications. A further example of a numerology with a relatively short OFDM symbol duration suitable for low latency communications is a numerology with 30 kHz subcarrier spacing. A numerology with 15 kHz subcarrier spacing may be compatible with LTE or serve as a default numerology for initial access of a device to a network. This 15 kHz numerology may also be suitable for broadband services. A numerology with 7.5 kHz spacing, which has a relatively long OFDM symbol duration, may be particularly useful for coverage enhancement and broadcasting. Additional uses for these numerologies will be or will become apparent to persons of ordinary skill in the art. Of the four numerologies listed, those with 30 kHz and 60 kHz subcarrier spacings are more robust to Doppler spreading (fast moving conditions), because of the wider subcarrier spacing. It is further contemplated that different numerologies may use different values for other physical layer parameters, such as the same subcarrier spacing and different cyclic prefix lengths.

It is further contemplated that other subcarrier spacings may be used, such as higher or lower subcarrier spacings. For example, other subcarrier spacings varying by a factor of $2^n$ include 120 kHz and 3.75 kHz.

In other examples, a more limited scalability may be implemented, in which two or more numerologies all have subcarrier spacings that are integer multiples of the smallest subcarrier spacing, without necessarily being related by a factor of $2^n$. Examples include 15 kHz, 30 kHz, 45 kHz, 60 kHz subcarrier spacings.

In still other examples, non-scalable subcarrier spacings may be used, which are not all integer multiples of the smallest subcarrier spacing, such as 15 kHz, 20 kHz, 30 kHz, 60 kHz.

OFDM-based signals can be employed to transmit a signal in which multiple numerologies coexist simultaneously. More specifically, multiple sub-band OFDM signals can be generated in parallel, each within a different sub-band, and each sub-band having a different subcarrier spacing (and more generally with a different numerology). The multiple sub-band signals are combined into a single signal for transmission, for example for downlink transmissions. Alternatively, the multiple sub-band signals may be transmitted from separate transmitters, for example for uplink transmissions from multiple electronic devices (EDs), which may be user equipments (UEs).

The use of different numerologies can allow the air interface 190 to support coexistence of a diverse set of use cases having a wide range quality of service (QoS) requirements, such as different levels of latency or reliability tolerance, as well as different bandwidth or signaling overhead requirements. In one example, the base station can signal to the ED an index representing a selected numerology, or a single parameter (e.g., subcarrier spacing) of the selected numerology. Based on this signaling, the ED may determine the parameters of the selected numerology from other information, such as a look-up table of candidate numerologies stored in memory.

Continuing with the components of the air interface 190, the multiple access scheme component 215 may specify how access to a channel is granted for one or more EDs. Non-limiting examples of multiple access technique options include technologies defining how EDs share a common physical channel, such as: Time Division Multiple Access (TDMA), Frequency Division Multiple Access (FDMA), Code Division Multiple Access (CDMA), Single Carrier Frequency Division Multiple Access (SC-FDMA), Low Density Signature Multicarrier Code Division Multiple Access (LDS-MC-CDMA), Non-Orthogonal Multiple Access (NOMA), Pattern Division Multiple Access (PDMA), Lattice Partition Multiple Access (LPMA), Resource Spread Multiple Access (RSMA), and Sparse Code Multiple Access (SCMA). Furthermore, the multiple access technique options may include scheduled access, non-scheduled access, also known as grant-free access, non-orthogonal multiple access, orthogonal multiple access, e.g., via a dedicated channel resource (i.e., no sharing between multiple EDs), contention-based shared channel resource, non-contention-based shared channel resource, and cognitive radio-based access.

The protocol component 220 may specify how a transmission and/or a re-transmission are to be made. Non-limiting examples of transmission and/or re-transmission mechanism options include those that specify a scheduled data pipe size, a signaling mechanism for transmission and/or a signaling mechanism for re-transmission.

The coding and modulation component 225 may specify how information being transmitted may be encoded/decoded and modulated/demodulated for transmission/reception purposes. Coding may refer to methods of error detection and forward error correction. Non-limiting examples of coding options include turbo trellis codes, turbo product codes, fountain codes, low-density parity check codes, and polar codes. Modulation may refer, simply, to the constellation (including, for example, the modulation technique and order), or more specifically to various types of advanced modulation methods such as hierarchical modulation and low PAPR modulation.

Because an air interface comprises a plurality of components or building blocks, and each component may have a plurality of candidate technologies (also referred to herein as air interface capability options), the air interface manager 200 may configure and store a large number of different air interface profiles, where each air interface profile defines a respective set of air interface capability options.

For example, in each air interface profile defining a respective set of air interface capability options, an air interface capability option is selected for each of the component building blocks of the air interface. Each of the different air interface profiles may be targeted to meet a different set of transmission requirements, including transmission content, transmit condition, and receive condition.

According to the transmission requirements of a pair of communicating transmitting-receiving devices, one of the different air interface profiles that best meet the transmission requirements may be selected from the air interface manager 200 and used for communications between the pair of communicating transmitting-receiving devices.

In further embodiments, the air interface manager 200 may modify or update its components, profiles, or capability options. For example, the air interface manager 200 may replace the waveform and frame structure components 205, 210, with a single numerology component 230. Conversely, the air interface manager 200 may separate the coding and modulation component 225 into an individual coding component and an individual modulation component. Furthermore, the air interface manager 200 may add a new soft air interface configuration component to be determined in the future.

The air interface manager 200 may also update certain components to modify the capability options of any given component. For example, the air interface manager 200 may update the modulation and coding component 225 to include higher-order modulation schemes.

By updating the stored components, profiles, and candidate options, the air interface manager 200 can flexibly adapt to better accommodate diverse wireless traffic types and services. Modifying or updating components, profiles, and candidate options may allow the air interface manager 200 to provide suitable air interface profiles for traffic types or services other than those already contemplated for ultra-reliable low latency communications (URLLC), enhanced mobile broadband (eMBB), and massive machine-type communications (mMTC).

Figure 3A:
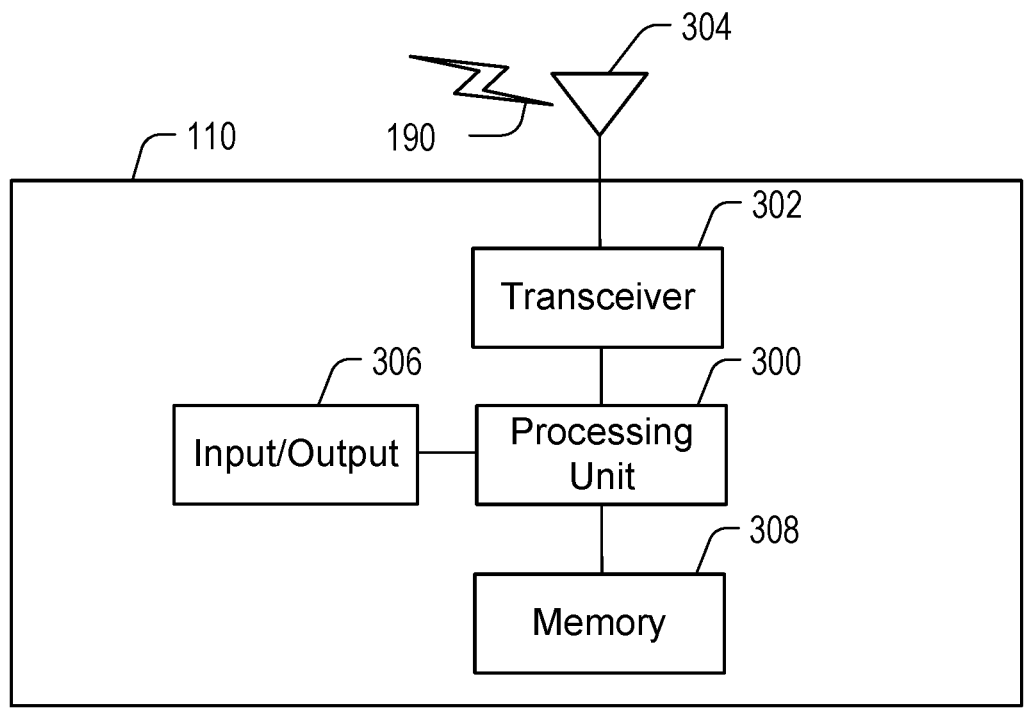
FIG. 3A is a block diagram of an example client side electronic device.
Figure 3B:
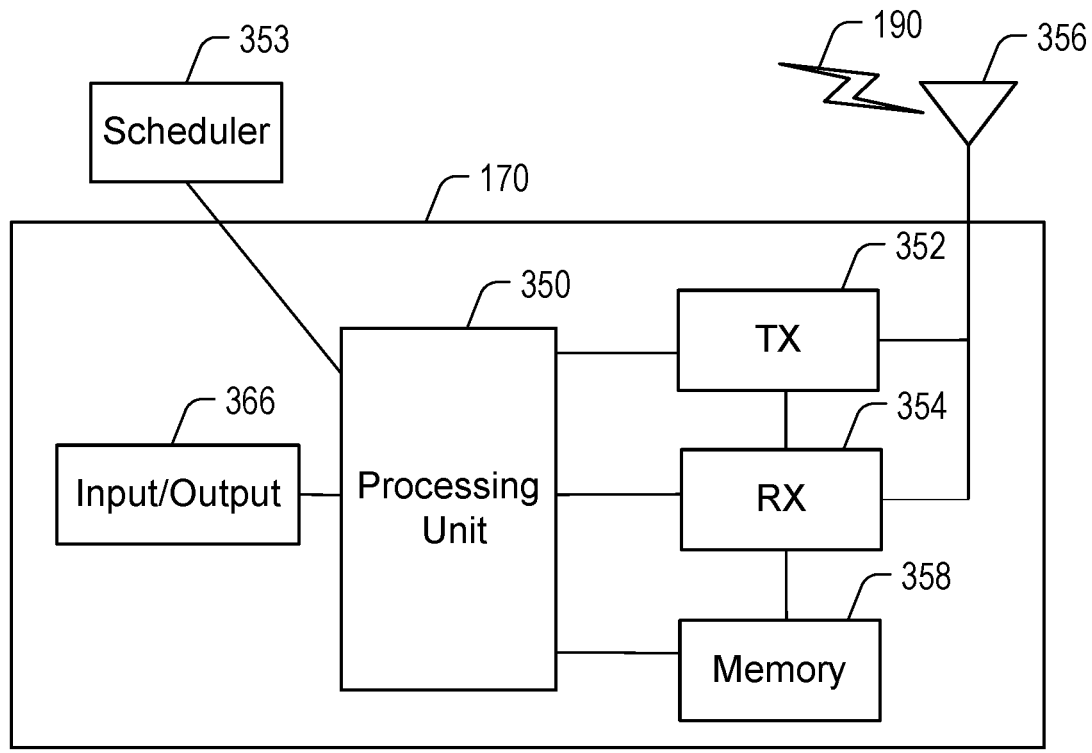
FIG. 3B is a block diagram of an example network side electronic device.

FIGS. 3A and 3B illustrate example devices that may implement the methods and teachings according to this disclosure. In particular, FIG. 3A illustrates an example ED 110, and FIG. 3B illustrates an example base station 170. These components could be used in the communication system 100 or in any other suitable system.

As shown in FIG. 3A, the ED 110 includes at least one processing unit 300. The processing unit 300 implements various processing operations of the ED 110. For example, the processing unit 300 could perform signal coding, data processing, power control, input/output processing, or any other functionality enabling the ED 110 to operate in the communication system 100. The processing unit 300 may also be configured to implement some or all of the functionality and/or embodiments described in more detail above. Each processing unit 300 includes any suitable processing or computing device configured to perform one or more operations. Each processing unit 300 could, for example, include a microprocessor, microcontroller, digital signal processor, field programmable gate array, or application specific integrated circuit.

The ED 110 also includes at least one transceiver 302. The transceiver 302 is configured to modulate data or other content for transmission by at least one antenna 304 or Network Interface Controller (NIC). The transceiver 302 is also configured to demodulate data or other content received by the at least one antenna 304. Each transceiver 302 includes any suitable structure for generating signals for wireless or wired transmission and/or processing signals received wirelessly or by wire. Each antenna 304 includes any suitable structure for transmitting and/or receiving wireless or wired signals. One or multiple transceivers 302 could be used in the ED 110. One or multiple antennas 304 could be used in the ED 110. Although shown as a single functional unit, a transceiver 302 could also be implemented using at least one transmitter and at least one separate receiver.

The ED 110 further includes one or more input/output devices 306 or interfaces (such as a wired interface to the internet 150). The input/output devices 306 permit interaction with a user or other devices in the network. Each input/output device 306 includes any suitable structure for providing information to or receiving information from a user, such as a speaker, microphone, keypad, keyboard, display, or touch screen, including network interface communications.

In addition, the ED 110 includes at least one memory 308. The memory 308 stores instructions and data used, generated, or collected by the ED 110. For example, the memory 308 could store software instructions or modules configured to implement some or all of the functionality and/or embodiments described above and that are executed by the processing unit(s) 300. Each memory 308 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3B, the base station 170 includes at least one processing unit 350, at least one transmitter (TX) 352, at least one receiver (RX) 354, one or more antennas 356, at least one memory 358, and one or more input/output devices or interfaces 366. A transceiver, not shown, may be used instead of the transmitter 352 and receiver 354. A scheduler 353 may be coupled to the processing unit 350. The scheduler 353 may be included within or operated separately from the base station 170. The processing unit 350 implements various processing operations of the base station 170, such as signal coding, data processing, power control, input/output processing, or any other functionality. The processing unit 350 can also be configured to implement some or all of the functionality and/or embodiments described in more detail above. Each processing unit 350 includes any suitable processing or computing device configured to perform one or more operations. Each processing unit 350 could, for example, include a microprocessor, microcontroller, digital signal processor, field programmable gate array, or application specific integrated circuit.

Each transmitter 352 includes any suitable structure for generating signals for wireless or wired transmission to one or more EDs or other devices. Each receiver 354 includes any suitable structure for processing signals received wirelessly or by wire from one or more EDs or other devices. Although shown as separate components, at least one transmitter 352 and at least one receiver 354 could be combined into a transceiver. Each antenna 356 includes any suitable structure for transmitting and/or receiving wireless or wired signals. Although a common antenna 356 is shown here as being coupled to both the transmitter 352 and the receiver 354, one or more antennas 356 could be coupled to the transmitter(s) 352, and one or more separate antennas 356 could be coupled to the receiver(s) 354. Each memory 358 includes any suitable volatile and/or non-volatile storage and retrieval device(s) such as those described above in connection to the ED 110. The memory 358 stores instructions and data used, generated, or collected by the base station 170. For example, the memory 358 could store software instructions or modules configured to implement some or all of the functionality and/or embodiments described above and that are executed by the processing unit(s) 350.

Each input/output device 366 permits interaction with a user or other devices in the network. Each input/output device 366 includes any suitable structure for providing information to or receiving/providing information from a user, including network interface communications.

As described above, downlink control information (DCI) is transmitted through physical downlink control channel (PDCCH) from the network side device, such as a base station, to the ED to provide the ED with information about specific physical layer parameters such as scheduling of downlink or uplink data, and other configuration parameters. The DCI may be transmitted using different DCI formats, which are designed for different purposes. Table 1 below shows examples of eight different DCI formats used for eight different purposes.

TABLE 1

| DCI format | Usage |
|---|---|
| 0_0 | Scheduling of Physical Uplink Shared Channel (PUSCH) in one cell |
| 0_1 | Scheduling of PUSCH in one cell |
| 1_0 | Scheduling of Physical Downlink Shared Channel (PDSCH) in one cell |
| 1_1 | Scheduling of PDSCH in one cell |
| 2_0 | Notifying a group of UEs of the slot format |
| 2_1 | Notifying a group of UEs of the physical resource block(s) (PRB(s)) and orthogonal frequency divisional multiplexed (OFDM) symbol(s) where UE may assume no transmission is intended for the UE |
| 2_2 | Transmission of transmit power control (TPC) commands for Physical Uplink Control Channel (PUCCH) and PUSCH |
| 2_3 | Transmission of a group of TPC commands for sounding reference signal (SRS) transmissions by one or more UEs |

DCI formats 0_0 and 1_0 are known as "fallback" DCI formats for scheduling of uplink data and downlink data, respectively. Fallback DCI formats are intended for use in performing basic radio link set up or reconfiguration or transmission of system information. They may include less information than other DCI formats, (i.e. the minimum amount of information to allow basic radio link set up or reconfiguration to occur).

DCI formats 0_1 and 1_1 are known as "non-fallback" DCI formats for scheduling of uplink data and downlink data, respectively. DCI formats 2_0 and 2_1 are DCI formats for notifying the ED about slot format information and pre-emption of information, respectively. DCI formats 2_2 and 2_3 are DCI formats for notifying ED about transmit power control information. While embodiments of the present application may be described below with specific reference to fallback DCI, it should be understood that more generally, aspects of the disclosure can be used with many different types of DCI.

The payload size of fallback DCI formats can be determined based on an initial downlink BWP, rather than the active downlink BWP. The initial downlink BWP is the frequency-domain size of a time-frequency resource allocated to a UE when it initially accesses a network. The initial BWP may be used after the initial network access, but often the UE will be configured with an active BWP when further utilizing the network. The active BWP can be reconfigured as appropriate. The initial downlink BWP size (in terms of number of resource blocks) can be different than an active downlink BWP. If the size of the frequency-domain resource allocation field in the DCI is determined by the number of resource blocks in the initial downlink BWP, this can create uncertainty or misinterpretation of the content of the fallback DCI when the DCI is used for resource allocation in the active BWP, if the active BWP has a different size than the initial downlink BWP. Embodiments of the present disclosure seek to resolve such uncertainty.

In addition to communicating the frequency-domain resource allocation in a fallback DCI format, embodiments of the present disclosure may also provide greater spectral efficiency when the fallback DCI is utilized for multiple UEs.

In New Radio (NR), resource allocation may be performed based on using a resource indication value (RIV) for the frequency domain resource allocation field included in the DCI formats. The resource allocation may be performed with or without virtual resource block (VRB) to physical resource block (PRB) interleave mapping. A form of RIV based resource allocation is utilized in LTE. However, in LTE RIV, resource allocation is based on the entire carrier size rather than a portion of the carrier size, i.e. BWP. An example of this resource allocation may be performed using Resource Allocation type 1.

FIG. 4A illustrates a set of virtual resource blocks (VRBs) in which a subset of VRBs is allocated for data transmission, which may, for example, include PDSCH that would be used for transmitting to one or more UEs or PUSCH that would be used for transmitting by the UE to the base station. The entire set of VRBs 410 is $N_{BWP}^{size}$ resource blocks in length, numbered from 0 to $N_{BWP}^{size}-1$. The resource allocated for the data transmission is a subset of VRBs 412 indicated to start at resource block $RB_{start}$ and is $L_{RBs}$ RBs in length.

With RIV based resource allocation, a single value, the RIV, is representative of two values, the starting resource block $RB_{start}$ value and a number of RBs being allocated $L_{RBs}$. In aspects of the present disclosure, the RIV value, when used in conjunction with a reference starting virtual resource block, i.e. VRB=0 and an overall size (defined in the number of RBs) of a frequency band $N_{BWP}^{size}$, can be used to determine the $RB_{start}$ value and the $L_{RBs}$.

In an example for which there is no interleave mapping between the VRBs and PRBs, VRB n is mapped to PRB n.

Figure 7:
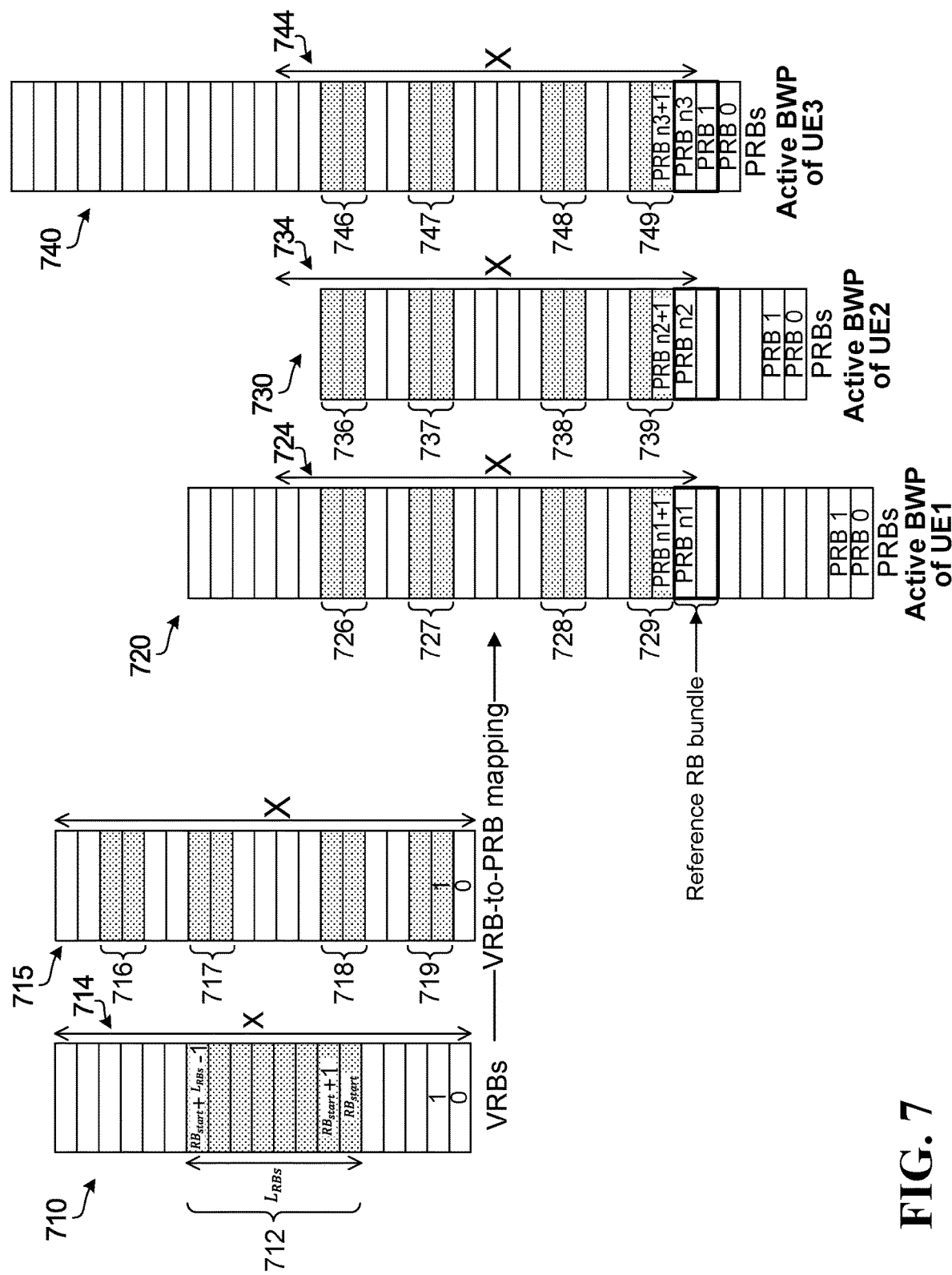
FIG. 7 is an example of an interleave mapping of the set of VRBs including the subset of VRBs onto a set of PRBs for three different UEs having different active BWPs.
Figure 8:
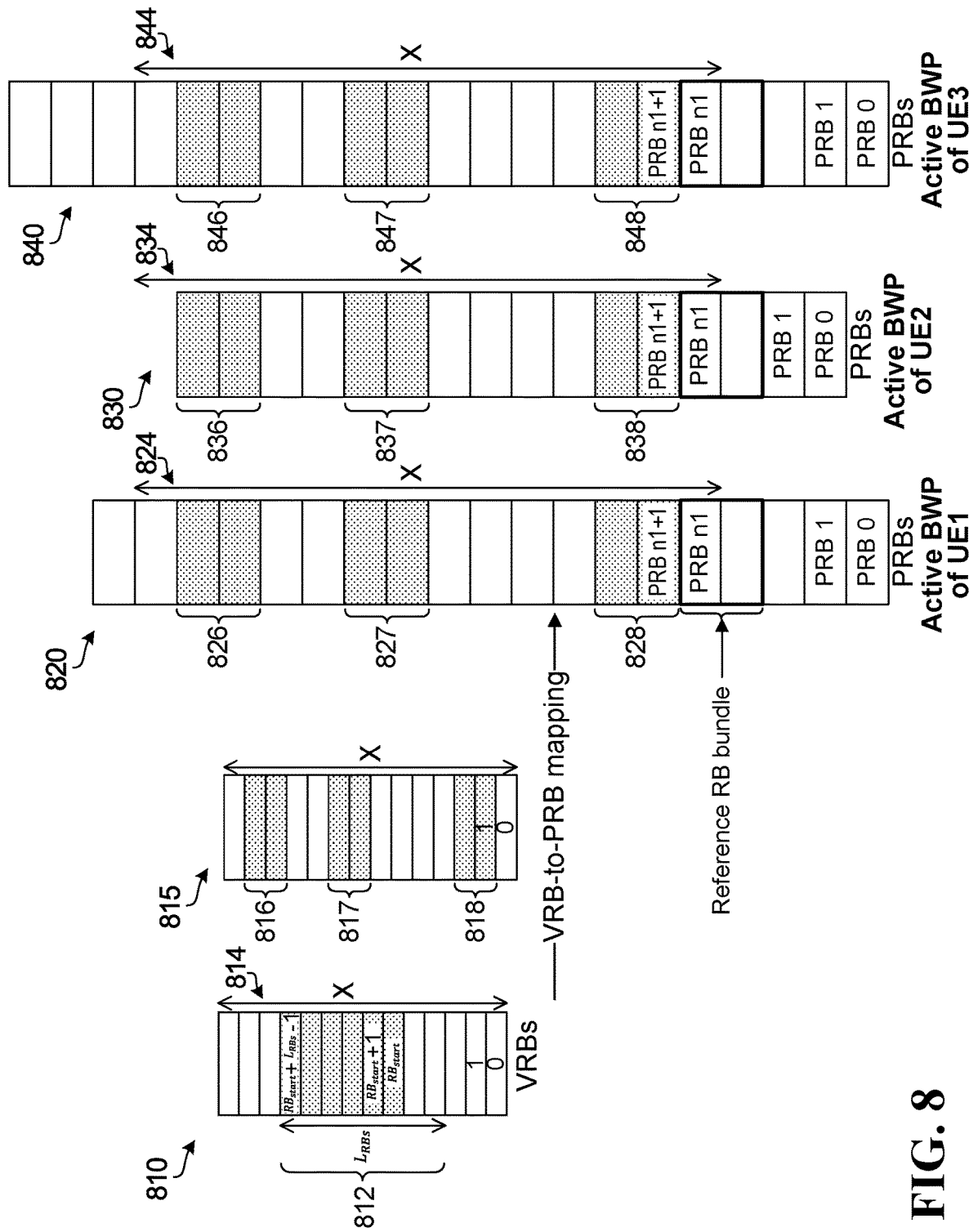
FIG. 8 is an example of an interleave mapping of the set of VRBs including the subset of VRBs onto a set of PRBs for three different UEs having different active BWPs and a different sub-carrier spacing configuration than the VRBs.

FIG. 4B illustrates an example of how the set of VRBs 410 from FIG. 4A can be mapped to a set of PRBs 420 having the same number of RBs as the set of VRBs, and for which there is an interleave mapping between the VRBs and PRBs. In the set of PRBs 420, the subset of VRBs 412 is spread, in RB bundles of two RBs 422, 424, 426, 428. The specific manner in which the bundles are distributed is not described in detail here. In this example the VRBs are mapped to an equal number of PRBs. However, as will be seen in examples below with regard to FIGS. 5, 6, 7 and 8, the set of VRBs can be mapped to a set of PRBs that is part of a different set of PRBs, i.e. an active BWP. In such cases the representation of FIG. 4B may be considered as an interim stage in the mapping of VRBs to PRB, for example as shown in FIGS. 7 and 8.

In some embodiments, the DCI is sent in a common search space and the DCI may be for more than one UE. If a DCI is meant to be decoded by a group of UEs, the group of UEs should have the same understanding about the DCI content. The DCI being received by all of the UEs in the group is a single DCI having a payload size. Therefore, it would be beneficial to have a common payload size that would be known to all of the UEs. This is one reason why the payload size of DCI format 0_0/1_0 (fallback DCI) can be determined based on the initial downlink bandwidth part (initial DL BWP), which is the same for all UEs accessing the network. This means, for example, that the size of $N_{BWP}^{size}$ can be assumed to be the number of resource blocks in the initial DL BWP. In some embodiments, the same scheduled PDSCH is allocated for a group of UEs to provide an efficient spectrum utilization. This means that the group of UEs will each access the same resource elements (REs) for PDSCH. In other words, all of the UEs in the group should have the same interpretation of the DCI fields, especially the frequency-domain resource allocation field, which includes a RIV, irrespective of the active DL BWP of a given UE. If the DCI size were to be determined by a value that is not common to all UEs, for example something other than the initial BWP, it would be difficult for UEs with different active BWPs to interpret the frequency domain resource allocation field in the DCI. The result may be that: the interpreted frequency location of the PDSCH would be within the frequency range of the active BWP of each UE in the group of UEs; and all UEs in the group of UEs would interpret the DCI such that they all obtain the same frequency location of PDSCH.

For frequency-domain resource allocation, when fallback DCI (DCI format 1_0 or 0_0) is decoded in a common search space, a reference RB (when interleave mapping is not used) or a reference RB bundle (when interleave mapping is used) is utilized to determine a starting physical resource block of a scheduled resource for the data transmission. For example, for non-interleaved VRB-to-PRB mapping, a virtual resource block n is mapped to physical resource block n+n_reference_RB. Whereas in the case of interleaved VRB-to-PRB mapping, a virtual resource block bundle j is mapped to physical resource block bundle f(j)+j_reference_RB_bundle. The BWP size used for interleaving is the reference PRB band size defined herein as X. A RB bundle size is fixed. Two non-limiting examples of RB bundle size are 2 RBs or 4 RBs.

For a common scheduled resource for multiple UEs, the reference RB, or reference RB bundle, has the same physical frequency location for the group for UEs. However, the reference RB, or reference RB bundle, can have a different PRB index or PRB bundle index in the active BWP of each UE in a group of UEs because the various UEs may have different sized active BWPs occurring at different starting RBs. This can be seen for example in FIG. 5 in the active BWPs of UE1, UE2 and UE3. The UEs should have at least an overlap of physical frequency locations equivalent to the size of the common schedule resource.

Various aspects of the present disclosure each provide alternative selections for the reference RB to be used on the VRB-to-PRB mapping. In a first embodiment, the reference RB is selected to be a lowest resource element group (REG) of a PDCCH where the fallback DCI (DCI format 0_0 or 1_0) has been decoded by the UE. In a second embodiment, the reference RB is selected to be a lowest-numbered PRB of the CORESET where the fallback DCI (DCI format 0_0 or 1_0) has been decoded by the UE. In a third embodiment, the reference RB is selected to be a lowest-numbered PRB of the configured CORESET with smallest CORESET ID in the active BWP. In a fourth embodiment, the reference RB is selected to be a lowest-numbered PRB of the initial DL BWP (or CORESET #0). In a fifth embodiment, the reference RB is selected to be a lowest-numbered PRB of the configured BWP with the smallest BWP ID. In a sixth embodiment, the reference RB is selected to be a lowest-numbered PRB of the default BWP. In a seventh embodiment, the reference RB is a PRB configured by higher layer signaling.

The following are more detailed descriptions of the first to seventh embodiments described above involved with selecting the reference RB to be used for mapping from virtual to physical resource blocks.

First Embodiment

For non-interleaved VRB-to-PRB mapping, virtual resource block n is mapped to physical resource block n, except for the case when fallback DCI is decoded in a common search space, in which case virtual resource block n is mapped to physical resource block $n+n_{REG}$ where physical resource block $n_{REG}$ corresponds to the lowest REG of the PDCCH where the fallback DCI has been decoded by the UE.

Second Embodiment

For non-interleaved VRB-to-PRB mapping, virtual resource block n is mapped to physical resource block n, except for the case when fallback DCI is decoded in a common search space, in which case virtual resource block n is mapped to physical resource block $n+n_{CORESET}^{start}$ where physical resource block $n_{CORESET}^{start}$ is the lowest-numbered physical resource block in the control resource set where the fallback DCI has been decoded by the UE.

Third Embodiment

For non-interleaved VRB-to-PRB mapping, virtual resource block n is mapped to physical resource block n, except for the case when fallback DCI is decoded in a common search space, in which case virtual resource block n is mapped to physical resource block $n+n_{CORESET}^{start}$ where physical resource block $n_{CORESET}^{start}$ is the lowest-numbered physical resource block in the control resource set with the lowest ID configured in the active bandwidth part.

Fourth Embodiment

For non-interleaved VRB-to-PRB mapping, virtual resource block n is mapped to physical resource block n, except for the case when fallback DCI is decoded in a common search space, in which case virtual resource block n is mapped to physical resource block $n+n_{PRB0}^{initial}$ where physical resource block $n_{PRB0}^{initial}$ corresponds to the same common resource block as the physical resource block 0 of the initial DL bandwidth part.

Fifth Embodiment

For non-interleaved VRB-to-PRB mapping, virtual resource block n is mapped to physical resource block n, except for the case when fallback DCI is decoded in a common search space, in which case virtual resource block n is mapped to physical resource block $n+n_{PRB0}$ where physical resource block $n_{PRB0}$ corresponds to the same common resource block as the physical resource block 0 of the bandwidth part configured with the smallest BWP ID.

Sixth Embodiment

For non-interleaved VRB-to-PRB mapping, virtual resource block n is mapped to physical resource block n, except for the case when fallback DCI is decoded in a common search space, in which case virtual resource block n is mapped to physical resource block $n+n_{PRB0}^{default}$ physical resource block $n_{PRB0}^{default}$ corresponds to the same common resource block as the physical resource block 0 of the default DL bandwidth part.

Seventh Embodiment

A PRB configured to the UE by higher layer signaling. For non-interleaved VRB-to-PRB mapping, virtual resource block n is mapped to physical resource block n, except for the case when fallback DCI is decoded in a common search space, in which case virtual resource block n is mapped to physical resource block $n+n_0$ where $n_0$ is configured by higher layer signaling.

Various aspects of the present disclosure each provide alternative selections for the reference RB bundle to be used on the interleaved VRB-to-PRB mapping. In an eighth embodiment, the reference RB bundle is selected to be the RB bundle which contains the reference RB of any of the first to seventh embodiments described above. In a ninth embodiment, the reference RB bundle is selected to be an RB bundle which contains a lowest resource element group (REG) of a PDCCH where the fallback DCI (DCI format 0_0 or 1_0) has been decoded by the UE. In a tenth embodiment, the reference RB bundle is selected to be an RB bundle which contains a lowest-numbered PRB of the CORESET where the fallback DCI (DCI format 0_0 or 1_0) has been decoded by the UE. In an eleventh embodiment, the reference RB bundle is selected to be an RB bundle which contains a lowest-numbered PRB of the configured CORESET with smallest CORESET ID in the active BWP. In a twelfth embodiment, the reference RB bundle is selected to be an RB bundle which contains a lowest-numbered PRB of the initial DL BWP (or CORESET #0). In a thirteenth embodiment, the reference RB bundle is selected to be an RB bundle which contains a lowest-numbered PRB of the configured BWP with the smallest BWP ID. In a fourteenth embodiment, the reference RB bundle is selected to be an RB bundle which contains a lowest-numbered PRB of the default BWP. In a fifteenth embodiment, the reference RB bundle is an RB bundle configured by higher layer signaling.

The following are more detailed descriptions of the ninth to fifteenth embodiments described above involved with selecting the reference RB to be used for mapping from virtual to physical resource blocks.

Ninth Embodiment

For interleaved VRB-to-PRB mapping, the mapping process is defined in terms of resource block bundles. If fallback DCI is decoded in a common search space, the UE shall assume $L_i=2$, and virtual resource block bundle $j \in \{0, 1, \ldots, N_{bundle}-2\}$ is mapped to physical resource block bundle $f(j)+j_{REG}$, where the physical resource block bundle $j_{REG}$ contains the lowest REG of the PDCCH where the fallback DCI has been decoded by the UE.

Tenth Embodiment

For interleaved VRB-to-PRB mapping, the mapping process is defined in terms of resource block bundles. If fallback DCI is decoded in a common search space, the UE shall assume $L_i=2$, and virtual resource block bundle $j \in \{0, 1, \ldots, N_{bundle}-2\}$ is mapped to physical resource block bundle $f(j)+j_{CORESET}^{start}$, where the physical resource block bundle $j_{CORESET}^{start}$ contains the lowest-numbered physical resource block in the control resource set where the fallback DCI has been decoded by the UE.

Eleventh Embodiment

For interleaved VRB-to-PRB mapping, the mapping process is defined in terms of resource block bundles. If fallback DCI is decoded in a common search space, the UE shall assume $L_i=2$, and virtual resource block bundle $j \in \{0, 1, \ldots, N_{bundle}-2\}$ is mapped to physical resource block bundle $f(j)+j_{CORESET}^{start}$, where the physical resource block bundle $j_{CORESET}^{start}$ contains the the lowest-numbered physical resource block in the control resource set with the lowest ID configured in the active bandwidth part.

Twelfth Embodiment

For interleaved VRB-to-PRB mapping, the mapping process is defined in terms of resource block bundles. If fallback DCI is decoded in a common search space, the UE shall assume $L_i=2$, and virtual resource block bundle $j \in \{0, 1, \ldots, N_{bundle}-2\}$ is mapped to physical resource block bundle $f(j)+j_{PRB0}^{initial}$, where the physical resource block bundle $j_{PRB0}^{initial}$ contains the physical resource block 0 of the initial DL bandwidth part.

Thirteenth Embodiment

For interleaved VRB-to-PRB mapping, the mapping process is defined in terms of resource block bundles. If fallback DCI is decoded in a common search space, the UE shall assume $L_i=2$, and virtual resource block bundle $j \in \{0, 1, \ldots, N_{bundle}-2\}$ is mapped to physical resource block bundle $f(j)+j_{PRB0}$, where the physical resource block bundle $j_{PRB0}$ contains the physical resource block 0 of the bandwidth part configured with the smallest BWP ID.

Fourteenth Embodiment

For interleaved VRB-to-PRB mapping, the mapping process is defined in terms of resource block bundles. If fallback DCI is decoded in a common search space, the UE shall assume $L_i=2$, and virtual resource block bundle $j \in \{0, 1, \ldots, N_{bundle}-2\}$ is mapped to physical resource block bundle $f(j)+j_{PRB0}^{default}$, where the physical resource block bundle $j_{PRB0}^{default}$ contains the physical resource block 0 of the default DL bandwidth part.

Fifteenth Embodiment

For interleaved VRB-to-PRB mapping, the mapping process is defined in terms of resource block bundles. If fallback DCI is decoded in a common search space, the UE shall assume $L_i=2$, and virtual resource block bundle $j \in \{0, 1, \ldots, N_{bundle}-2\}$ is mapped to physical resource block bundle $f(j)+j_0$ where the physical resource block bundle $j_0$ is configured by higher layer signaling.

In some embodiments, for example when using resource allocation type 1, when a fallback DCI (DCI format 1_0 or 0_0) is decoded in a common search space, a reference RB band size (X) is used to determine the BWP size. The reference PRB band size is used for RIV calculation or VRB-to-PRB mapping, or both. In some embodiments, a first reference RB band size (X1) is used for RIV calculation and a second reference RB band size (X2) is used for VRB-to-PRB mapping.

The reference PRB band size (X) can be the same for a group of UEs, if the group of UEs are all being provided with group information via the fallback DCI.

Various aspects of the present disclosure each provide alternative selections for the PRB band size (X) to be used for RIV calculation or VRB-to-PRB mapping, or both. In a first embodiment, the PRB band size (X) is selected to be the size of the initial DL BWP (i.e. size of CORESET #0). In a second embodiment, the PRB band size (X) is selected to be a frequency size of the CORESET where the fallback DCI has been decoded by the UE. The frequency size of a CORESET refers to a number of PRBs from the lowest-numbered PRB of the CORESET to the highest-numbered PRB of the CORESET. In a third embodiment, the PRB band size (X) is selected to be a frequency size of the configured CORESET with smallest CORESET ID in the active BWP. In a fourth embodiment, the PRB band size (X) is selected to be a size of the configured BWP with the smallest BWP ID. In a fifth embodiment, the PRB band size (X) is selected to be a size of the default BWP. In a sixth embodiment, the PRB band size (X) is configured by higher layer signaling. In some embodiments, wherein a first reference RB band size (X1) is used for RIV calculation and a second reference RB band size (X2) is used for VRB-to-PRB mapping, any of the first to sixth embodiments described above can be used for the first RB band size (X1) or the second RB band size (X2) or both.

The following are more detailed descriptions of the first to sixth embodiments described above involved with selecting the PRB band size to be used for RIV calculation or mapping from virtual to physical resource blocks. Any of the first to fifteenth embodiments for selecting the reference RB to be used on the VRB-to-PRB mapping may be combined with the first to sixth embodiments for selecting the PRB band size.

First Embodiment

For RIV calculation or VRB-to-PRB mapping, the BWP size is equal to the number of resource blocks of the initial DL BWP. Optionally, for interleaved VRB-to-PRB mapping, the mapping process is further defined in terms of resource block bundles. If the fallback DCI is decoded in a common search space, the UE shall assume the bundle size $L=2$.

Second Embodiment

For RIV calculation or VRB-to-PRB mapping, the BWP size is equal to the number of resource blocks from the lowest-numbered resource block to the highest-numbered resource block of the control resource set where the fallback DCI has been decoded by the UE. Optionally, for interleaved VRB-to-PRB mapping, the mapping process is further defined in terms of resource block bundles. If the fallback DCI is decoded in a common search space, the UE shall assume the bundle size $L=2$.

Third Embodiment

For RIV calculation or VRB-to-PRB mapping, the BWP size is equal to the number of resource blocks from the lowest-numbered resource block to the highest-numbered resource block of the control resource set with the lowest ID configured in the active bandwidth part. Optionally, for interleaved VRB-to-PRB mapping, the mapping process is further defined in terms of resource block bundles. If the fallback DCI is decoded in a common search space, the UE shall assume the bundle size L=2.

Fourth Embodiment

For RIV calculation or VRB-to-PRB mapping, the BWP size is equal to the number of resource blocks in the bandwidth part configured with the smallest BWP ID. Optionally, for interleaved VRB-to-PRB mapping, the mapping process is further defined in terms of resource block bundles. If the fallback DCI is decoded in a common search space, the UE shall assume the bundle size L=2.

Fifth Embodiment

For RIV calculation or VRB-to-PRB mapping, the BWP size is equal to the number of resource blocks in the default bandwidth part. Optionally, for interleaved VRB-to-PRB mapping, the mapping process is further defined in terms of resource block bundles. If the fallback DCI is decoded in a common search space, the UE shall assume the bundle size L=2.

Sixth Embodiment

For RIV calculation or VRB-to-PRB mapping, the BWP size is equal to the number of resource blocks configured by higher layer signaling. Optionally, for interleaved VRB-to-PRB mapping, the mapping process is further defined in terms of resource block bundles. If the fallback DCI is decoded in a common search space, the UE shall assume the bundle size L=2.

FIGS. 5, 6, 7 and 8 include examples of how mapping may be performed from virtual resource blocks (VRBs) to physical resource block (PRBs). A base station is responsible for allocating the VRBs and transmitting the DCI that notifies a UE or group of UEs of the allocated resources available to the UE or groups of UEs. The UE or group of UEs receive the DCI and once decoded, access the allocated resource to receive data in the case of PDSCH, or transmit data back to the base station in the case of PUSCH. The four figures illustrate the VRBs, which may be considered to be processed at the base station and the PRBs in respective active bandwidth parts (BWPs) for each of three respective UEs.

Figure 5:
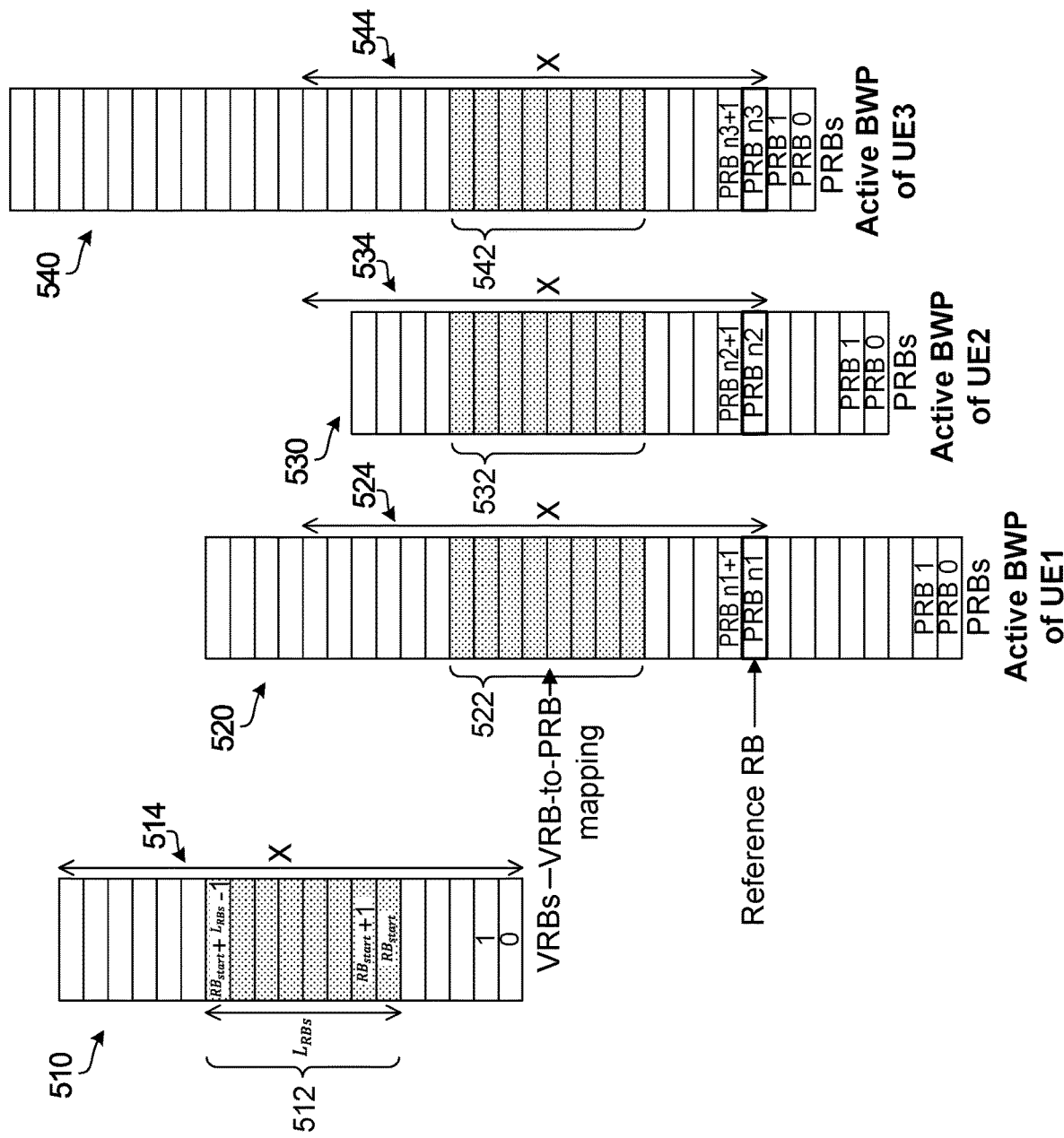
FIG. 5 is an example of a non-interleave mapping of the set of VRBs including the subset of VRBs onto a set of PRBs for three different user equipment (UEs) having different active bandwidth parts (BWPs).

FIG. 5 illustrates an example of a mapping of a set of VRBs to three different sets of PRBs, one set of PRBs for each of three UEs. In this example there is no interleave mapping as part of the mapping from VRB and PRB. The set of VRBs 510 having a subset of the VRBs 512 scheduled for a data transmission is substantially the same as the set of VRBs in FIG. 4A. The data transmission may be for either uplink (PUSCH) or downlink (PDSCH). Each set of PRBs 520, 530, 540 corresponds to an active bandwidth part for a different respective UE. Each of the sets of PRBs has a respective number of PRBs. In the example of FIG. 5 the number of PRBs, i.e. the BWP size, is different in each active BWP. More generally, it is to be understood that the number of PRBs in a respective UE BWP can be UE-specific. The first PRB in each set of PRBs 520, 530, 540 has a starting PRB=0. All three sets of PRBs 520, 530, 540 have a same reference PRB, relative to one another, but this reference PRB is at a different PRB in the active BWP with respect to the PRB=0. Therefore, it is to be understood that the reference PRB is the same physical frequency location for all three UEs. In all three sets of PRBs 520, 530, 540, the set of PRBs 522, 532, 542 that are allocated for a particular transmission 510, fall within the active BWP of each respective UE.

In the first set of PRBs 520, the set of PRBs 524 that correspond to the set of VRBs 514, fall within the active BWP of UE1. In the third set of PRBs 540, the set of PRBs 544 that correspond to the set of VRBs 514, fall within the active BWP of UE3. In the second set of PRBs 530, the set of PRBs 534 that correspond to the set of VRBs 514, extends beyond the active BWP of UE2. While the set of PRBs 534 may extend outside the active BWP in the case of UE2, it should be understood that this only occurs because the base station serving the UE, or more generally the controlling network, is the one ultimately allocating the size of the active BWPs for the UEs, defining the size of the set of VRBs 514 and the size of the scheduled VRBs 512. As a result, the base station is intelligent enough to not schedule and transmit information to any given UE it is serving outside of the active BWP that the base station has also allocated.

Figure 6:
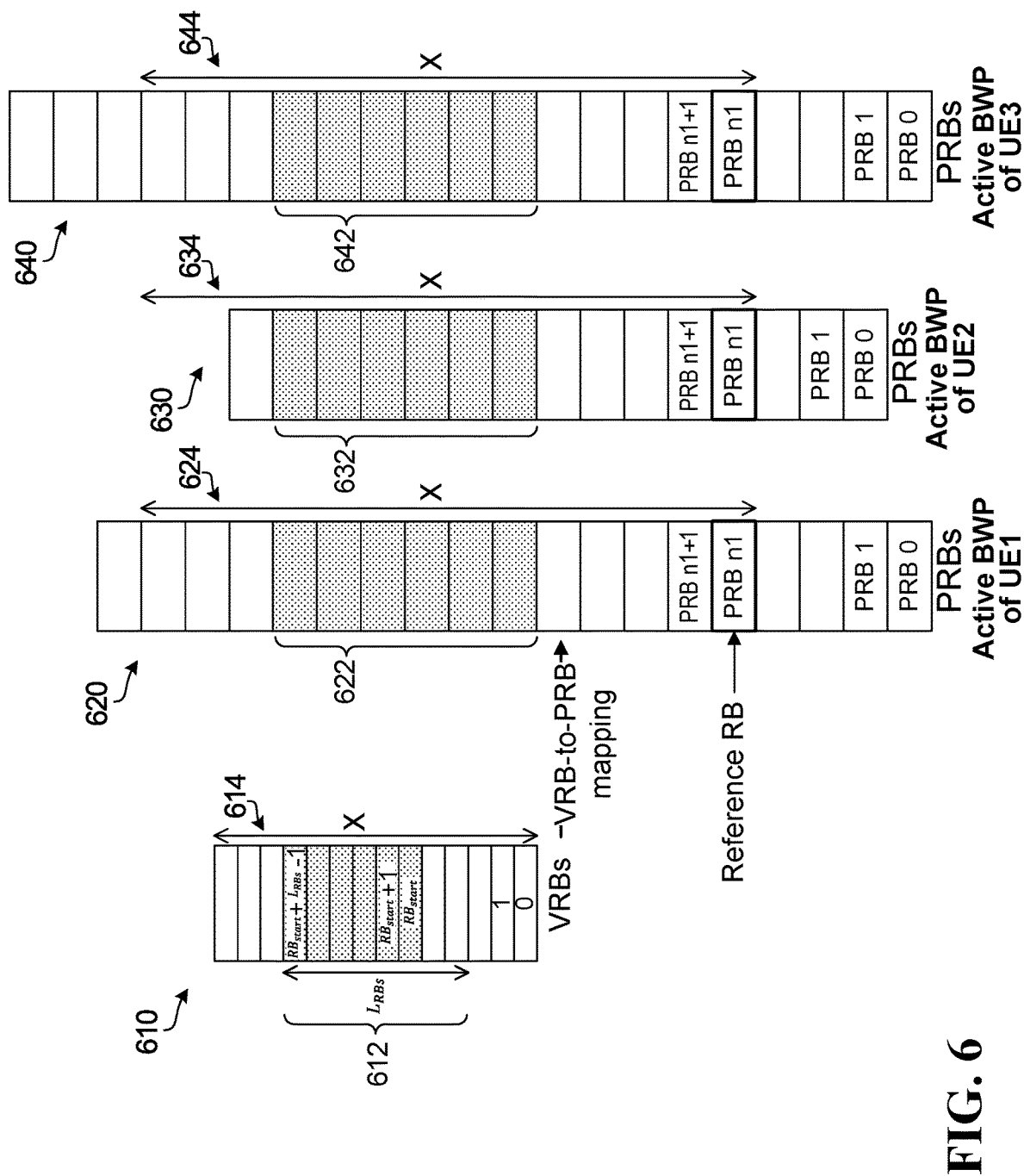
FIG. 6 is an example of a non-interleave mapping of the set of VRBs including the subset of VRBs onto a set of PRBs for three different UEs having different active BWPs and a different sub-carrier spacing configuration than the VRBs.

FIG. 6 illustrates another example of a mapping of a set of VRBs to three different sets of PRBs, one set of PRBs for each of three UEs. In this example, there is no interleave mapping as part of the mapping from VRB and PRB. In this example, the sub-carrier spacing configuration of the VRBs is not the same as for the sub-carrier spacing configuration of the PRBs. The height of the respective PRBs in the sets of PRBs 620, 630, 640 can be seen to be approximately double the height of the VRBs in the set of VRBs 610. This may for example be representative of a wider sub-carrier spacing of the individual PRBs than that of the individual VRBs. The set of VRBs 610 having a subset of the VRBs 612 scheduled for a data transmission is substantially the same as the set of VRBs in FIG. 4A. The data transmission may be for uplink or downlink. Each set of PRBs 620, 630, 640 corresponds to an active bandwidth part for a different respective UE. Each of the sets of PRBs has a respective number of PRBs. In the example of FIG. 6, the number of PRBs is different in each active BWP. More generally, it is to be understood that the number of PRBs in a respective UE BWP can be UE-specific. The first PRB in each set of PRBs 620, 630, 640 has a starting PRB=0. All three sets of PRBs 620, 630, 640 have a same reference PRB, relative to one another, but this reference PRB is at a different PRB in the active BWP with respect to the PRB=0. Therefore, it is to be understood that the reference PRB is the same physical frequency location for all three UEs. In all three sets of PRBs 620, 630, 640, the set of PRBs 622, 632, 642 that are allocated for a particular transmission 610, fall within the active BWP of each respective UE.

In the first set of PRBs 620, the set of PRBs 624 that correspond to the set of VRBs 614, fall within the active BWP of UE1. In the third set of PRBs 640, the set of PRBs 644 that correspond to the set of VRBs 614, fall within the active BWP of UE3. In the second set of PRBs 630, the set of PRBs 634 that correspond to the set of VRBs 614, extends beyond the active BWP of UE2. While the set of PRBs 634 may extend outside the active BWP in the case of UE2, it should be understood that this only occurs because the base station serving the UEs, or more generally the controlling network, is the one ultimately allocating the size of the active BWPs for the UEs, defining the size of the set of VRBs 614 and the size of the scheduled VRBs 612. As a result, the base station is intelligent enough to not schedule and transmit information to any given UE it is serving outside of the active BWP that the base station has also allocated.

FIG. 7 illustrates another example of a mapping of a set of VRBs to three different sets of PRBs, one set of PRBs for each of three UEs. In this example there is interleave mapping as part of the mapping from VRB and PRB. The set of VRBs 710 having a subset of the VRBs 712 scheduled for a data transmission is interleaved as part of the VRB to PRB mapping as can be seen in 715. The data transmission may be for uplink or downlink. The subset of the VRBs 712 scheduled for the data transmission can be mapped in sets of RB bundles of 2 RBs 716, 717, 718, and 719, which is substantially the same as in FIG. 4B. Each set of PRBs 720, 730, 740 corresponds to an active bandwidth part for a different respective UE. Each of the sets of PRBs has a respective number of PRBs. In the example of FIG. 7 the number of PRBs is different in each active BWP. More generally it is to be understood that the number of PRBs in a respective UE BWP can be UE-specific. The first PRB in each set of PRBs 720, 730, 740 has a starting PRB=0. All three sets of PRBs 720, 730, 740 have a same reference PRB, relative to one another, but this reference PRB is at a different PRB in the active BWP with respect to the PRB=0. The grid which is used for positioning of the PRB bundles can be configured in a fixed manner in the system and the location of the reference PRB will occur within the bundle accordingly. Therefore, the reference PRB may or may not be the first PRB in a PRB bundle. In the example of FIG. 7, the reference PRB in each of the active BWPs is the second PRB of a 2 PRB bundle. Once again, it is to be understood that the reference PRB and more generally the reference PRB bundle, is the same physical frequency location for all three UEs. In all three sets of PRBs 720, 730, 740, the interleaved bundles of PRBs (for example 726, 727, 728, 729 in 720) that correspond to the interleaved VRB bundles (716, 717, 718, 719 in 715), fall within the active BWP of each respective UE.

In the first set of PRBs 720, the set of PRBs 724 that correspond to the set of VRBs 714, fall within the active BWP of UE1. In the third set of PRBs 740, the set of PRBs 744 that correspond to the set of VRBs 714, fall within the active BWP of UE3. In the second set of PRBs 730, the set of PRBs 734 that correspond to the set of VRBs 714, extends beyond the active BWP of UE2. While the set of PRBs 734 may extend outside the active BWP in the case of UE2, it should be understood that this only occurs because the base station serving the UEs, or more generally the controlling network, is the one ultimately allocating the size of the active BWPs for the UEs, defining the size of the set of VRBs 714, defining the interleaving mapping being used and the size of the bundles and the size of the scheduled VRBs 712. As a result, the base station is intelligent enough to not schedule and transmit information to any given UE it is serving outside of the active BWP that the base station has also allocated.

FIG. 8 illustrates another example of a mapping of a set of VRBs to three different sets of PRBs, one set of PRBs for each of three UEs. In this example there is interleave mapping as part of the mapping from VRB and PRB. In this example, the sub-carrier spacing configuration of the VRBs is not the same as for the sub-carrier spacing configuration of the PRBs. The height of the respective PRBs in the sets of PRBs 820, 830, 840 can be seen to be approximately double the height of the VRBs in the set of VRBs 810. This may for example be representative of a wider sub-carrier spacing of the individual PRBs than that of the individual VRBs. The set of VRBs 810 having a subset of the VRBs 812 scheduled for a data transmission is interleaved as part of the VRB to PRB mapping, as can be seen in 815. The data transmission may be for uplink or downlink. The subset of the VRBs 812 scheduled for the data transmission can be set to be mapped in sets of RB bundles of 2 RBs 816, 817 and 818, which is substantially the same as in FIG. 4B. Each set of PRBs 820, 830, 840 corresponds to an active bandwidth part for a different respective UE. Each of the sets of PRBs has a respective number of PRBs. In the example of FIG. 8 the number of PRBs is different in each active BWP. More generally it is to be understood that the number of PRBs in a respective UE BWP can be UE-specific. The first PRB in each set of PRBs 820, 830, 840 has a starting PRB=0. All three sets of PRBs 820, 830, 840 have a same reference PRB, relative to one another, but this reference PRB is at a different PRB in the active BWP with respect to the PRB=0. The grid which is used for positioning of the PRB bundles can be configured in a fixed manner in the system and the location of the reference PRB will occur within the bundle accordingly. Therefore, the reference PRB may or may not be the first PRB in a PRB bundle. In the example of FIG. 8, the reference PRB in each of the active BWPs is the second PRB of a 2 PRB bundle. Once again, it is to be understood that the reference PRB and more generally the reference PRB bundle, is the same physical frequency location for all three UEs. In all three sets of PRBs 820, 830, 840, the interleaved bundles of PRBs (for example 826, 827, 828 in 820) that correspond to the interleaved VRB bundles 816, 817, 818 in 815, fall within the active BWP of each respective UE.

In the first set of PRBs 820, the set of PRBs 824 that correspond to the set of VRBs 814, fall within the active BWP of UE1. In the third set of PRBs 840, the set of PRBs 844 that correspond to the set of VRBs 814, fall within the active BWP of UE3. In the second set of PRBs 830, the set of PRBs 834 that correspond to the set of VRBs 814, extends beyond the active BWP of UE2. While the set of PRBs 834 may extend outside the active BWP in the case of UE2, it should be understood that this only occurs because the base station serving the UEs, or more generally the controlling network, is the one ultimately allocating the size of the active BWPs for the UEs, defining the size of the set of VRBs 814, defining the interleaving mapping being used and the size of the bundles and the size of the scheduled VRBs 812. As a result, the base station is intelligent enough to not schedule and transmit information to any given UE it is serving outside of the active BWP that the base station has also allocated.

Figure 9:
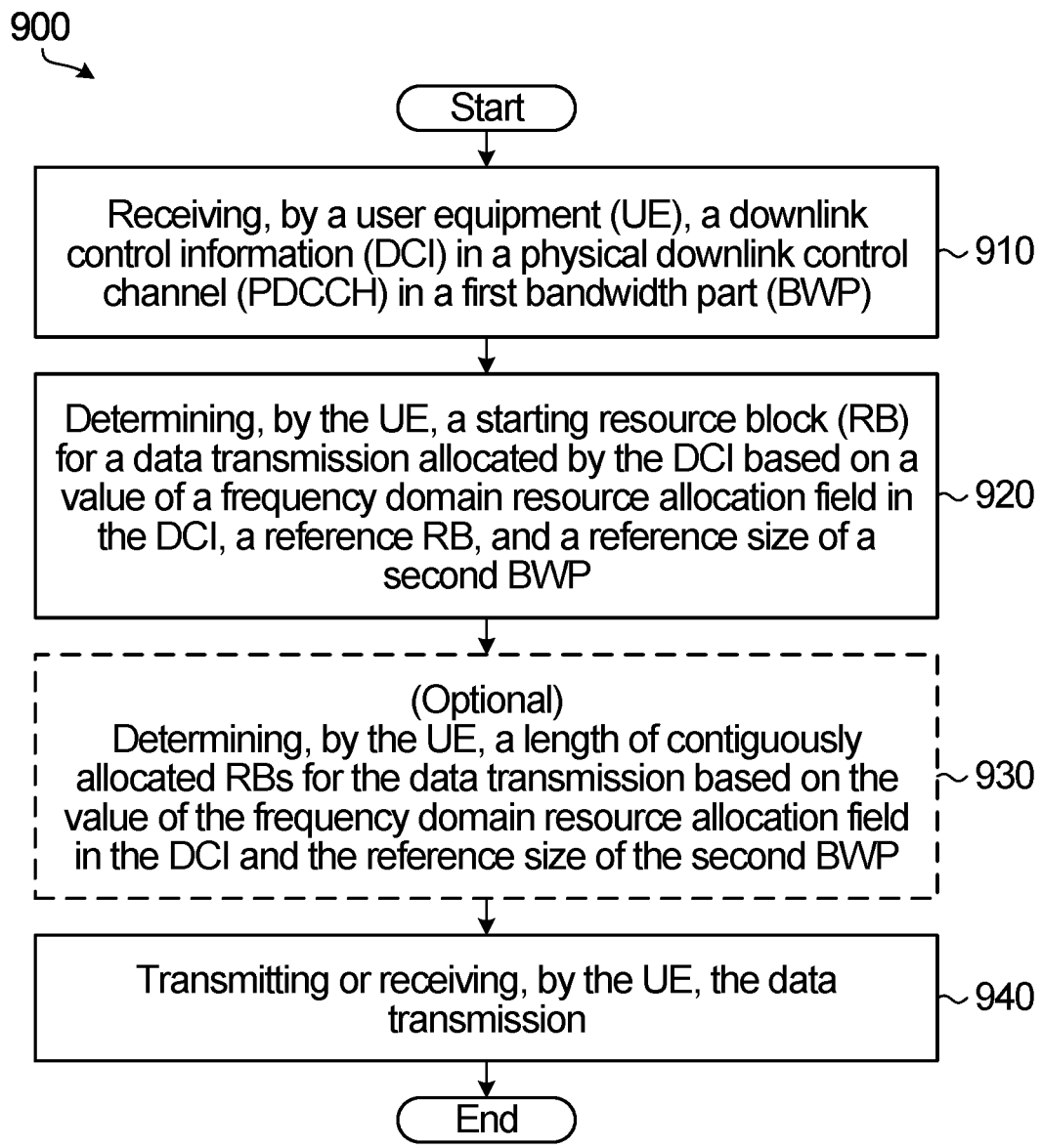
FIG. 9 is a flow chart describing a method for use by a UE in locating a transmission resource allocated in a Downlink Control Information (DCI).

FIG. 9 illustrates a flow chart describing an example method 900 for wireless communication according to an embodiment of the disclosure. The method involves a user equipment (UE) receiving 910 a downlink control information (DCI) in a physical downlink control channel (PDCCH) in a first bandwidth part (BWP).

Another step 920 involves the UE determining a starting resource block (RB) for a data transmission allocated by the DCI based on a value of a frequency domain resource allocation field in the DCI, a reference RB, and a reference size of a second BWP.

The reference RB can be at least one of:
  (a) a lowest-numbered resource element group (REG) of the PDCCH where the DCI has been decoded by the UE;
  (b) a lowest-numbered physical resource block (PRB) of a control resource set (CORESET) in which the DCI has been decoded by the UE;

(c) a lowest-numbered PRB of a configured CORESET with a smallest CORESET identifier (ID) in the active BWP;
(d) a lowest-numbered PRB of the initial DL BWP used by the UE;
(e) a lowest-numbered PRB of a configured BWP with a smallest BWP ID;
(f) a lowest-numbered PRB of a default BWP; and
(g) a PRB configured by higher layer signaling.

The reference size of the second BWP is a number of RBs equal to at least one of:
(a) a number of RBs of the initial DL BWP;
(b) a number of RBs defining a control resource set (CORESET) in which the DCI has been decoded by the UE;
(c) a number of RBs defining a configured CORESET with a smallest CORESET identifier (ID) in the active BWP;
(d) a number of RBs defining a size of a configured BWP with a smallest BWP ID;
(e) a number of RBs defining a size of a default BWP; and
(f) a number of RBs configured by higher layer signaling.

An optional step 930 may involve the UE determining a length of contiguously allocated RBs for the data transmission based on the value of the frequency domain resource allocation field in the DCI and the reference size of the second BWP.

Once a time-frequency resource is established, defined at least by the starting RB and the length of the contiguously allocated RBs, the UE can either 940 transmit the data transmission, in the example of PUSCH or receive the data transmission, in the example of PDSCH, in the established time-frequency resource.

In some embodiments, the DCI is associated with a group of UEs, and the data transmission allocated by the DCI is a downlink data transmission allocated in the same time-frequency resource for all UEs in the group of UEs.

In some embodiments, the first BWP is an active BWP and the second BWP is an initial downlink (DL) BWP.

In some embodiments, RBs that are allocated for the data transmission are distributed over the first BWP based on an interleave mapping of bundles of virtual RBs to interleaved bundles of physical RBs. In such a scenario, the starting RB is a virtual starting RB and the reference RB is a virtual reference RB.

In some embodiments, the UE also determines the interleaved bundles of physical RBs for the data transmission based on at least the virtual starting RB, the interleave mapping, and a reference bundle of physical RBs. In such a scenario, transmitting or receiving the data transmission involves transmitting or receiving the data transmission allocated in a time-frequency resource defined at least in part by the interleaved bundles of physical RBs.

In some embodiments, the virtual starting RB defines the start of a length of contiguously allocated virtual RBs and determining the interleaved bundles of physical RBs involves determining the interleaved bundles of physical RBs further based on the length of contiguously allocated virtual RBs.

Figure 10:
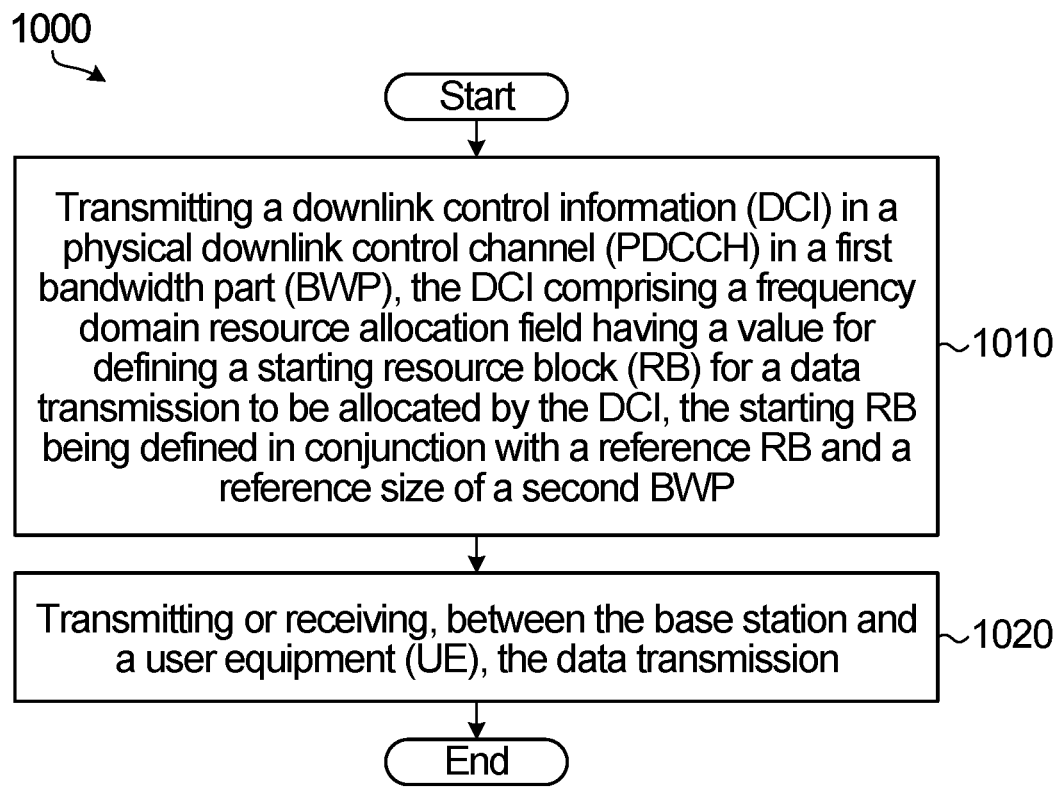
FIG. 10 is a flow chart describing a method for use by a network-side device in allocating a transmission resource.

FIG. 10 illustrates a flow chart describing an example method 1000 for wireless communication according to an embodiment of the disclosure. The method involves transmitting 1010 a downlink control information (DCI) in a physical downlink control channel (PDCCH) in a first bandwidth part (BWP). The DCI includes a frequency domain resource allocation field having a value for defining a starting resource block (RB) for a data transmission to be allocated by the DCI, the starting RB being defined in conjunction with a reference RB and a reference size of a second BWP. A further step 1020 involves transmitting or receiving, between the base station and a user equipment (UE), the data transmission.

In some embodiments, the value of the frequency domain resource allocation field further defines a length of contiguously allocated RBs for the data transmission. The transmitting or receiving of the data transmission in 1020 involves transmitting or receiving the data transmission allocated in a time-frequency resource defined at least by the starting RB and the length of the contiguously allocated RBs.

In some embodiments, RBs that are allocated for the data transmission are distributed over the first BWP based on an interleave mapping of bundles of virtual RBs to interleaved bundles of physical RBs. In such a scenario, the starting RB is a virtual starting RB and the reference RB is a virtual reference RB.

In some embodiments, the interleaved bundles of physical RBs for the data transmission are defined by the virtual starting RB, the interleave mapping, a length of contiguously allocated virtual RBs, and a reference bundle of physical RBs. In such a scenario, the transmitting or receiving the data transmission in 1020 involves transmitting or receiving the data transmission allocated in a time-frequency resource defined at least in part by the interleaved bundles of physical RBs.

Figure 11:
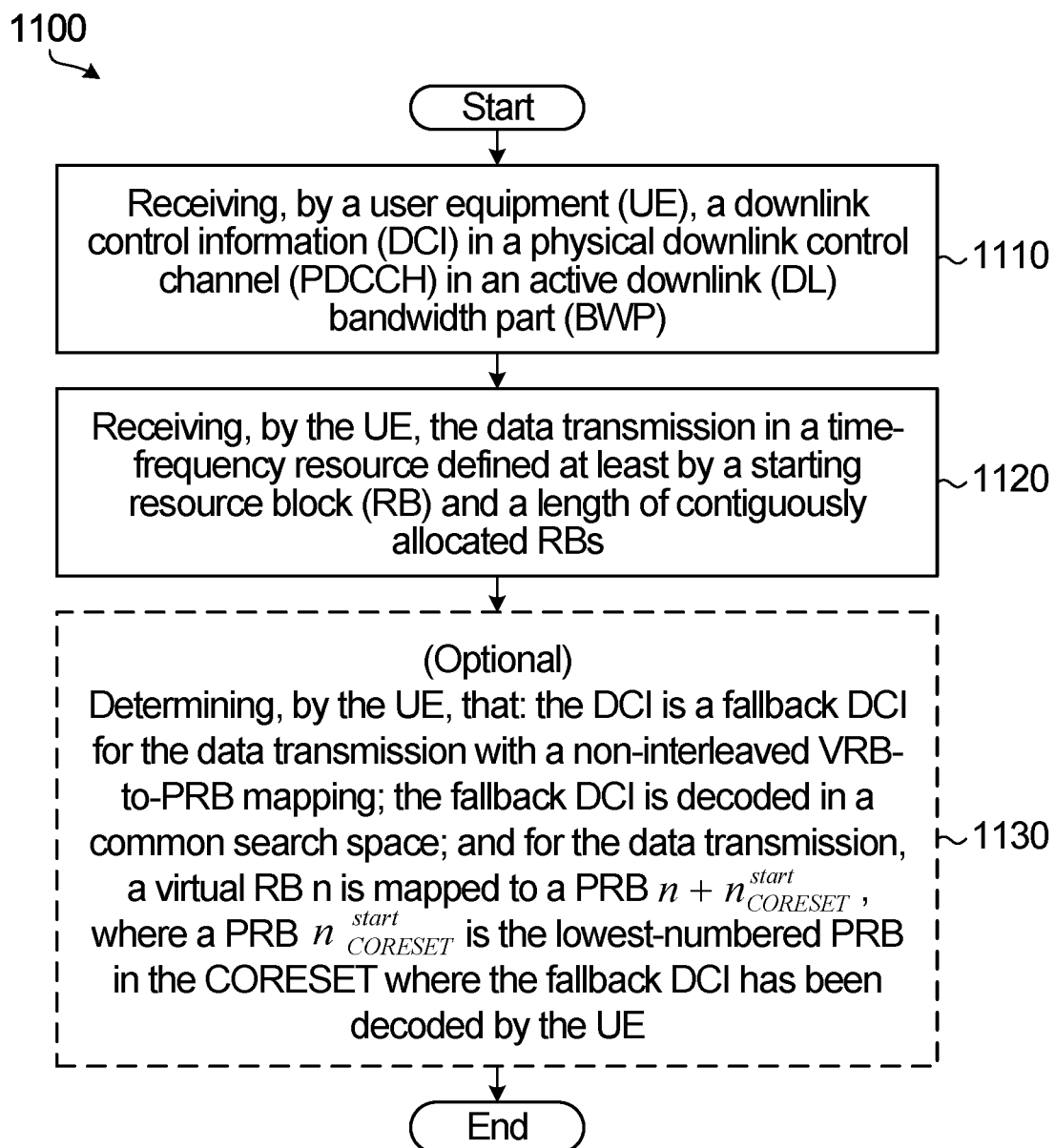
FIG. 11 is a flow chart describing another method for use by a UE in locating a transmission resource allocated in a Downlink Control Information (DCI).

FIG. 11 illustrates a flow chart describing another example method 1100 for wireless communication according to an embodiment of the disclosure. The method involves the UE receiving 1110 a downlink control information (DCI) in a physical downlink control channel (PDCCH) in an active downlink (DL) bandwidth part (BWP). The DCI is for scheduling a data transmission, and the DCI includes a frequency domain resource allocation field.

Another step 1120 involves receiving, by the UE, the data transmission in a time-frequency resource defined at least by a starting resource block (RB) and a length of contiguously allocated RBs. The starting RB is based on: a value of the frequency domain resource allocation field in the DCI, a reference RB, and a number of RBs of a first control resource set (CORESET). The length of contiguously allocated RBs is based on: the value of the frequency domain resource allocation field in the DCI and the number of RBs of the first CORESET.

In some embodiments, receiving the data transmission involves receiving the data transmission in a time-frequency resource defined by the interleaved bundles of physical RBs, the interleaved bundles of physical RBs based on: the virtual starting RB, the length of contiguously allocated virtual RBs, the interleave mapping, and a reference bundle of physical RBs.

In some embodiments, the reference RB is a lowest-numbered physical resource block (PRB) in a second CORESET, wherein the second CORESET is a CORESET where the DCI has been decoded by the UE.

A further step 1130, that is optional, involves determining, by the UE, that: the DCI is a fallback DCI for the data transmission with a non-interleaved VRB-to-PRB mapping; the fallback DCI is decoded in a common search space; and for the data transmission, a virtual RB n is mapped to a PRB $n+n_{CORESET}^{start}$, where a PRB $n_{CORESET}^{start}$ is the lowest-numbered PRB in the CORESET where the fallback DCI has been decoded by the UE.

In some embodiments, the active DL BWP includes a distribution of RBs for the data transmission based on an interleave mapping of bundles of virtual RBs to interleaved bundles of physical RBs, wherein the starting RB is a virtual starting RB and the length of contiguously allocated RBs is a length of contiguously allocated virtual RBs, and wherein the virtual starting RB defines a start of the length of contiguously allocated virtual RBs.

In some embodiments, the reference bundle of physical RBs is a bundle of physical RBs that contains a lowest-numbered physical resource block (PRB) in a second CORESET, wherein the second CORESET is a CORESET where the DCI has been decoded by the UE.

In some embodiments, the DCI is a fallback DCI.

In some embodiments, the first CORESET is associated with a CORESET identifier of "0".

In some embodiments, the DCI is associated with a group of UEs, and the data transmission scheduled by the DCI is a downlink data transmission allocated in the same time-frequency resource for all UEs in the group of UEs.

Figure 12:
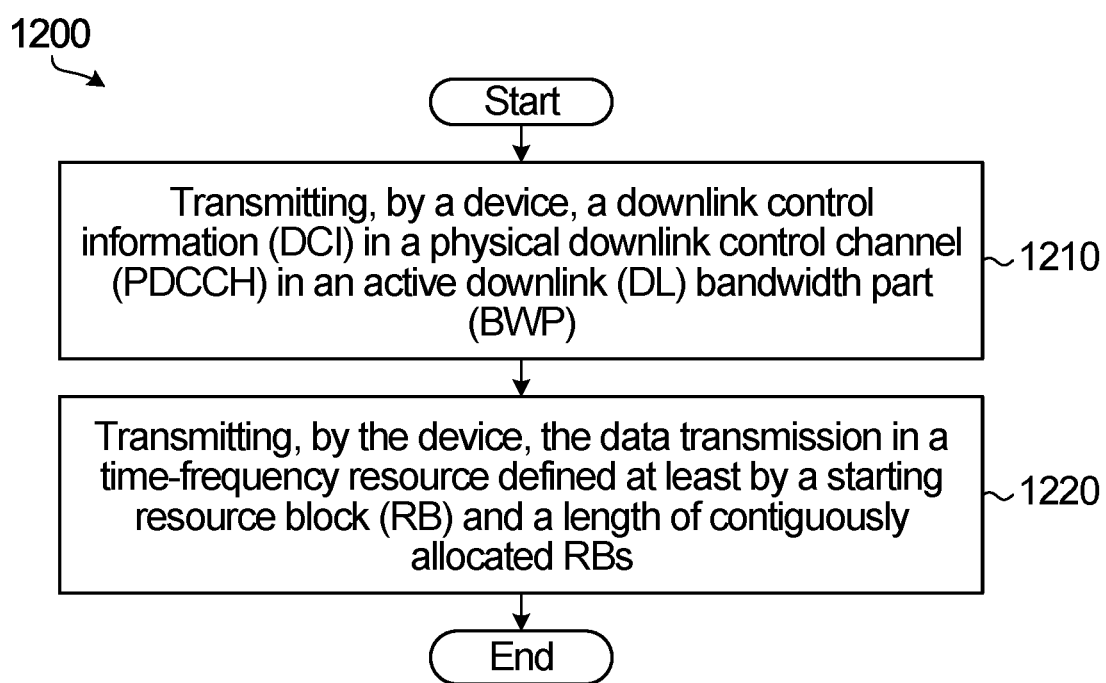
FIG. 12 is a flow chart describing another method for use by a network-side device in allocating a transmission resource.

FIG. 12 illustrates a flow chart describing another example method 1200 for wireless communication according to an embodiment of the disclosure. The method 1200 involves a device transmitting 1210 a downlink control information (DCI) in a physical downlink control channel (PDCCH) in an active downlink (DL) bandwidth part (BWP). The DCI is for scheduling a data transmission and the DCI includes a frequency domain resource allocation field. The device may be a network access point, such as a base station, for example.

Another step 1220 involves transmitting, by the device to a UE, the data transmission in a time-frequency resource defined at least by a starting resource block (RB) and a length of contiguously allocated RBs. The starting RB is based on: a value of the frequency domain resource allocation field in the DCI, a reference RB, and a number of RBs of a first control resource set (CORESET). The length of contiguously allocated RBs is based on: the value of the frequency domain resource allocation field in the DCI and the number of RBs of the first CORESET.

In some embodiments, the reference RB is a lowest-numbered physical resource block (PRB) in a second CORESET, wherein the second CORESET is a CORESET where the DCI has been decoded by the UE.

In some embodiments, the active DL BWP includes a distribution of RBs for the data transmission based on an interleave mapping of bundles of virtual RBs to interleaved bundles of physical RBs, wherein the starting RB is a virtual starting RB and the length of contiguously allocated RBs is a length of contiguously allocated virtual RBs, and wherein the virtual starting RB defines a start of the length of contiguously allocated virtual RBs.

In some embodiments, transmitting the data transmission includes transmitting the data transmission in a time-frequency resource defined by the interleaved bundles of physical RBs, the interleaved bundles of physical RBs based on: the virtual starting RB, the length of contiguously allocated virtual RBs, the interleave mapping, and a reference bundle of physical RBs.

In some embodiments, the reference bundle of physical RBs is a bundle of physical RBs that contains a lowest-numbered physical resource block (PRB) in a second CORESET, wherein the second CORESET is a CORESET where the DCI has been decoded by the UE.

In some embodiments, the DCI is a fallback DCI.

In some embodiments, the first CORESET is associated with a CORESET identifier of "0".

In some embodiments, the DCI is associated with a group of UEs, and the data transmission scheduled by the DCI is a downlink data transmission allocated in the same time-frequency resource for all UEs in the group of UEs.

According to an aspect of the disclosure, there is provided a method for wireless communication. The method involves receiving, by a user equipment (UE), a downlink control information (DCI) in a physical downlink control channel (PDCCH) in a first bandwidth part (BWP); determining, by the UE, a starting resource block (RB) for a data transmission allocated by the DCI based on a value of a frequency domain resource allocation field in the DCI, a reference RB, and a reference size of a second BWP; and transmitting or receiving, by the UE, the data transmission.

In some embodiments, the method of further involves determining, by the UE, a length of contiguously allocated RBs for the data transmission based on the value of the frequency domain resource allocation field in the DCI and the reference size of the second BWP, wherein transmitting or receiving the data transmission comprises transmitting or receiving the data transmission allocated in a time-frequency resource defined at least by the starting RB and the length of the contiguously allocated RBs.

In some embodiments, the DCI is associated with a group of UEs, and the data transmission allocated by the DCI is a downlink data transmission allocated in the same time-frequency resource for all UEs in the group of UEs.

In some embodiments, the first BWP is an active BWP and the second BWP is an initial downlink (DL) BWP.

In some embodiments, the reference RB is at least one of: a lowest-numbered resource element group (REG) of the PDCCH where the DCI has been decoded by the UE; a lowest-numbered physical resource block (PRB) of a control resource set (CORESET) in which the DCI has been decoded by the UE; a lowest-numbered PRB of a configured CORESET with a smallest CORESET identifier (ID) in the active BWP; a lowest-numbered PRB of the initial DL BWP used by the UE; a lowest-numbered PRB of a configured BWP with a smallest BWP ID; a lowest-numbered PRB of a default BWP; and a PRB configured by higher layer signaling.

In some embodiments, the reference size of the second BWP is a number of RBs equal to at least one of: a number of RBs of the initial DL BWP; a number of RBs defining a control resource set (CORESET) in which the DCI has been decoded by the UE; a number of RBs defining a configured CORESET with a smallest CORESET identifier (ID) in the active BWP; a number of RBs defining a size of a configured BWP with a smallest BWP ID; a number of RBs defining a size of a default BWP; and a number of RBs configured by higher layer signaling.

In some embodiments, RBs allocated for the data transmission are distributed over the first BWP based on an interleave mapping of bundles of virtual RBs to interleaved bundles of physical RBs, wherein the starting RB is a virtual starting RB and the reference RB is a virtual reference RB.

In some embodiments, the method of further involves determining, by the UE, the interleaved bundles of physical RBs for the data transmission based on at least the virtual starting RB, the interleave mapping, and a reference bundle of physical RBs, wherein transmitting or receiving the data transmission comprises transmitting or receiving the data transmission allocated in a time-frequency resource defined at least in part by the interleaved bundles of physical RBs.

In some embodiments, the virtual starting RB defines the start of a length of contiguously allocated virtual RBs, and determining the interleaved bundles of physical RBs comprises determining the interleaved bundles of physical RBs further based on the length of contiguously allocated virtual RBs.

In some embodiments, the DCI is a fallback DCI.

According to another aspect of the disclosure, there is provided a user equipment (UE) including: a processor and a computer-readable medium having stored thereon computer-executable instructions. When executed by the processor, the computer-executable instructions cause the UE to: receive, by a user equipment (UE), a downlink control information (DCI) in a physical downlink control channel (PDCCH) in a first bandwidth part (BWP); determine, by the UE, a starting resource block (RB) for a data transmission allocated by the DCI based on a value of a frequency domain resource allocation field in the DCI, a reference RB, and a reference size of a second BWP; and transmit or receive, by the UE, the data transmission.

In some embodiments, the computer-executable instructions, when executed by the processor, further cause the UE to: determine, by the UE, a length of contiguously allocated RBs for the data transmission based on the value of the frequency domain resource allocation field in the DCI and the reference size of the second BWP, wherein transmitting or receiving the data transmission comprises transmitting or receiving the data transmission allocated in a time-frequency resource defined at least by the starting RB and the length of the contiguously allocated RBs.

In some embodiments, the DCI is associated with a group of UEs, and the data transmission allocated by the DCI is a downlink data transmission allocated in the same time-frequency resource for all UEs in the group of UEs.

In some embodiments, the first BWP is an active BWP and the second BWP is an initial downlink (DL) BWP.

In some embodiments, the reference RB is at least one of: a lowest-numbered resource element group (REG) of the PDCCH where the DCI has been decoded by the UE; a lowest-numbered physical resource block (PRB) of a control resource set (CORESET) in which the DCI has been decoded by the UE; a lowest-numbered PRB of a configured CORESET with a smallest CORESET identifier (ID) in the active BWP; a lowest-numbered PRB of the initial DL BWP used by the UE; a lowest-numbered PRB of a configured BWP with a smallest BWP ID; a lowest-numbered PRB of a default BWP; and a PRB configured by higher layer signaling.

In some embodiments, the reference size of the second BWP is a number of RBs equal to at least one of: a number of RBs of the initial DL BWP; a number of RBs defining a control resource set (CORESET) in which the DCI has been decoded by the UE; a number of RBs defining a configured CORESET with a smallest CORESET identifier (ID) in the active BWP; a number of RBs defining a size of a configured BWP with a smallest BWP ID; a number of RBs defining a size of a default BWP; and a number of RBs configured by higher layer signaling.

In some embodiments, RBs allocated for the data transmission are distributed over the first BWP based on an interleave mapping of bundles of virtual RBs to interleaved bundles of physical RBs, wherein the starting RB is a virtual starting RB and the reference RB is a virtual reference RB.

In some embodiments, the computer-executable instructions, when executed by the processor, further cause the UE to: determine the interleaved bundles of physical RBs for the data transmission based on at least the virtual starting RB, the interleave mapping, and a reference bundle of physical RBs, wherein transmitting or receiving the data transmission comprises transmitting or receiving the data transmission allocated in a time-frequency resource defined at least in part by the interleaved bundles of physical RBs.

In some embodiments, the virtual starting RB defines the start of a length of contiguously allocated virtual RBs, and determining the interleaved bundles of physical RBs comprises determining the interleaved bundles of physical RBs further based on the length of contiguously allocated virtual RBs.

In some embodiments, the DCI is a fallback DCI.

According to a further aspect of the disclosure, there is provided a method for wireless communication. The method includes: transmitting a downlink control information (DCI) in a physical downlink control channel (PDCCH) in a first bandwidth part (BWP), the DCI comprising a frequency domain resource allocation field having a value for defining a starting resource block (RB) for a data transmission to be allocated by the DCI, the starting RB being defined in conjunction with a reference RB and a reference size of a second BWP; and transmitting or receiving, between the base station and a user equipment (UE), the data transmission.

In some embodiments, the value of the frequency domain resource allocation field further defines a length of contiguously allocated RBs for the data transmission, and wherein transmitting or receiving the data transmission comprises transmitting or receiving the data transmission allocated in a time-frequency resource defined at least by the starting RB and the length of the contiguously allocated RBs.

In some embodiments, RBs allocated for the data transmission are distributed over the first BWP based on an interleave mapping of bundles of virtual RBs to interleaved bundles of physical RBs, wherein the starting RB is a virtual starting RB and the reference RB is a virtual reference RB.

In some embodiments, the interleaved bundles of physical RBs for the data transmission are defined by the virtual starting RB, the interleave mapping, a length of contiguously allocated virtual RBs, and a reference bundle of physical RBs, wherein transmitting or receiving the data transmission comprises transmitting or receiving the data transmission allocated in a time-frequency resource defined at least in part by the interleaved bundles of physical RBs.

In some embodiments, the VRBs have a different subcarrier spacing configuration than the PRBs.

According to yet another aspect of the disclosure, there is provided device including a processor and a computer-readable medium having stored thereon computer-executable instructions. When executed by the processor, the computer-executable instructions cause the device: transmit a downlink control information (DCI) in a physical downlink control channel (PDCCH) in a first bandwidth part (BWP), the DCI comprising a frequency domain resource allocation field having a value for defining a starting resource block (RB) for a data transmission to be allocated by the DCI, the starting RB being defined in conjunction with a reference RB and a reference size of a second BWP; and transmit or receive, between the base station and a user equipment (UE), the data transmission.

In some embodiments, the value of the frequency domain resource allocation field further defines a length of contiguously allocated RBs for the data transmission, and wherein transmitting or receiving the data transmission comprises transmitting or receiving the data transmission allocated in a time-frequency resource defined at least by the starting RB and the length of the contiguously allocated RBs.

In some embodiments, RBs allocated for the data transmission are distributed over the first BWP based on an interleave mapping of bundles of virtual RBs to interleaved bundles of physical RBs, wherein the starting RB is a virtual starting RB and the reference RB is a virtual reference RB.

In some embodiments, the interleaved bundles of physical RBs for the data transmission are defined by the virtual starting RB, the interleave mapping, a length of contiguously allocated virtual RBs, and a reference bundle of physical RBs, wherein transmitting or receiving the data transmission comprises transmitting or receiving the data transmission allocated in a time-frequency resource defined at least in part by the interleaved bundles of physical RBs.

In some embodiments, the VRBs have a different subcarrier spacing configuration than the PRBs.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for wireless communication, the method comprising:
   receiving, by an apparatus, a downlink control information (DCI) in a physical downlink control channel (PDCCH) in an active downlink (DL) bandwidth part (BWP), the DCI for scheduling a data transmission, and the DCI comprising a frequency domain resource allocation field;
   determining, by the apparatus, that the DCI is a fallback DCI for the data transmission with a non-interleaved virtual resource block (VRB)-to-physical resource block (PRB) mapping; and
   receiving, by the apparatus, the data transmission in a time-frequency resource defined at least by a starting resource block (RB) and a length of contiguously allocated RBs,
   the starting RB based on: a value of the frequency domain resource allocation field in the fallback DCI, a reference RB, and a number of RBs of a first control resource set (CORESET), and
   the length of contiguously allocated RBs based on: the value of the frequency domain resource allocation field in the fallback DCI and the number of RBs of the first CORESET,
   wherein the reference RB is a lowest-numbered PRB in a second CORESET, wherein the fallback DCI is decoded in a common search space, wherein, for the data transmission, a VRB n is mapped to a PRB n+$n_{CORESET}^{start}$, wherein n is an integer greater than or equal to zero, wherein $n_{CORESET}^{start}$ is an index number of the lowest-numbered PRB in the second CORESET, and wherein the second CORESET is a CORESET where the fallback DCI has been decoded by the apparatus.

2. The method of claim 1, wherein the first CORESET is associated with a CORESET identifier of "0" (zero).

3. The method of claim 1, wherein the DCI is associated with a group of apparatuses, and the data transmission scheduled by the DCI is a downlink data transmission allocated in the same time-frequency resource for all apparatuses in the group of apparatuses.

4. An apparatus comprising:
   a processor; and
   a non-transitory computer-readable medium having stored thereon computer-executable instructions, that when executed by the processor, cause the apparatus to:
   receive a downlink control information (DCI) in a physical downlink control channel (PDCCH) in an active downlink (DL) bandwidth part (BWP), the DCI for scheduling a data transmission, and the DCI comprising a frequency domain resource allocation field;
   determine that the DCI is a fallback DCI for the data transmission with a non-interleaved virtual resource block (VRB)-to-physical resource block (PRB) mapping; and
   receive the data transmission in a time-frequency resource defined at least by a starting resource block (RB) and a length of contiguously allocated RBs,
   the starting RB based on: a value of the frequency domain resource allocation field in the fallback DCI, a reference RB, and a number of RBs of a first control resource set (CORESET), and
   the length of contiguously allocated RBs based on: the value of the frequency domain resource allocation field in the fallback DCI and the number of RBs of the first CORESET,
   wherein the reference RB is a lowest-numbered PRB in a second CORESET, wherein the fallback DCI is decoded in a common search space, wherein, for the data transmission, a VRB n is mapped to a PRB n+$n_{CORESET}^{start}$, wherein n is an integer greater than or equal to zero, wherein $n_{CORESET}^{start}$ is an index number of the lowest-numbered PRB in the second CORESET, and wherein the second CORESET is a CORESET where the fallback DCI has been decoded by the apparatus.

5. The apparatus of claim 4, wherein the first CORESET is associated with a CORESET identifier of "0" (zero).

6. The apparatus of claim 4, wherein the DCI is associated with a group of apparatuses, and the data transmission scheduled by the DCI is a downlink data transmission allocated in the same time-frequency resource for all apparatuses in the group of apparatuses.

7. A method for wireless communication, the method comprising:
   transmitting, by a base station, a downlink control information (DCI) in a physical downlink control channel (PDCCH) in an active downlink (DL) bandwidth part (BWP), the DCI for scheduling a data transmission, and the DCI comprising a frequency domain resource allocation field; and
   transmitting, by the base station to a user equipment (UE), the data transmission in a time-frequency resource defined at least by a starting resource block (RB) and a length of contiguously allocated RBs, the starting RB based on: a value of the frequency domain resource allocation field in the DCI, a reference RB, and a number of RBs of a first control resource set (CORESET), and the length of contiguously allocated RBs based on: the value of the frequency domain resource allocation field in the DCI and the number of RBs of the first CORESET,
   wherein the active DL BWP comprises a distribution of RBs for the data transmission based on an interleave mapping of bundles of virtual RBs to interleaved bundles of physical RBs, wherein the starting RB is a virtual starting RB and the length of contiguously allocated RBs is a length of contiguously allocated virtual RBs, and wherein the virtual starting RB defines a start of the length of contiguously allocated virtual RBs.

8. A method for wireless communication, the method comprising:
receiving, by an apparatus, a downlink control information (DCI) in a physical downlink control channel (PDCCH) in an active downlink (DL) bandwidth part (BWP), the DCI for scheduling a data transmission, and the DCI comprising a frequency domain resource allocation field; and
receiving, by the apparatus, the data transmission in a time-frequency resource defined at least by a starting resource block (RB) and a length of contiguously allocated RBs,
the starting RB based on: a value of the frequency domain resource allocation field in the DCI, a reference RB, and a number of RBs of a first control resource set (CORESET), and
the length of contiguously allocated RBs based on: the value of the frequency domain resource allocation field in the DCI and the number of RBs of the first CORESET,
wherein the active DL BWP comprises a distribution of RBs for the data transmission based on an interleave mapping of bundles of virtual RBs to interleaved bundles of physical RBs, wherein the starting RB is a virtual starting RB and the length of contiguously allocated RBs is a length of contiguously allocated virtual RBs, and wherein the virtual starting RB defines a start of the length of contiguously allocated virtual RBs.

9. The method of claim 8, wherein the receiving the data transmission comprises:
receiving the data transmission in the time-frequency resource defined by the interleaved bundles of physical RBs, the interleaved bundles of physical RBs based on: the virtual starting RB, the length of contiguously allocated virtual RBs, the interleave mapping, and a reference bundle of physical RBs.

10. The method of claim 6, wherein the reference bundle of physical RBs is a bundle of physical RBs that contains a lowest-numbered physical resource block (PRB) in a second CORESET, and wherein the second CORESET is a CORESET where the DCI has been decoded by the apparatus.

11. The method of claim 8, wherein the DCI is a fallback DCI.

12. The method of claim 8, wherein the first CORESET is associated with a CORESET identifier of 0 (zero).

13. The method of claim 8, wherein the DCI is associated with a group of apparatuses, and the data transmission scheduled by the DCI is a downlink data transmission allocated in the same time-frequency resource for all apparatuses in the group of apparatuses.

14. An apparatus comprising:
a processor; and
a non-transitory computer-readable medium having stored thereon computer-executable instructions, that when executed by the processor, cause the apparatus to:
receive a downlink control information (DCI) in a physical downlink control channel (PDCCH) in an active downlink (DL) bandwidth part (BWP), the DCI for scheduling a data transmission, and the DCI comprising a frequency domain resource allocation field; and
receive the data transmission in a time-frequency resource defined at least by a starting resource block (RB) and a length of contiguously allocated RBs,
the starting RB based on: a value of the frequency domain resource allocation field in the DCI, a reference RB, and a number of RBs of a first control resource set (CORESET), and
the length of contiguously allocated RBs based on: the value of the frequency domain resource allocation field in the DCI and the number of RBs of the first CORESET,
wherein the active DL BWP comprises a distribution of RBs for the data transmission based on an interleave mapping of bundles of virtual RBs to interleaved bundles of physical RBs, wherein the starting RB is a virtual starting RB and the length of contiguously allocated RBs is a length of contiguously allocated virtual RBs, and wherein the virtual starting RB defines a start of the length of contiguously allocated virtual RBs.

15. The apparatus of claim 14, wherein the computer-executable instructions that cause the apparatus to receive the data transmission cause the apparatus to:
receive the data transmission in the time-frequency resource defined by the interleaved bundles of physical RBs, the interleaved bundles of physical RBs based on: the virtual starting RB, the length of contiguously allocated virtual RBs, the interleave mapping, and a reference bundle of physical RBs.

16. The apparatus of claim 15, wherein the reference bundle of physical RBs is a bundle of physical RBs that contains a lowest-numbered physical resource block (PRB) in a second CORESET, and wherein the second CORESET is a CORESET where the DCI has been decoded by the apparatus.

17. The apparatus of claim 14, wherein the DCI is a fallback DCI.

18. The apparatus of claim 14, wherein the first CORESET is associated with a CORESET identifier of 0 (zero).

19. The apparatus of claim 14, wherein the DCI is associated with a group of apparatuses, and the data transmission scheduled by the DCI is a downlink data transmission allocated in the same time-frequency resource for all apparatuses in the group of apparatuses.

* * * * *

UNITED STATES PATENT AND TRADEMARK OFFICE
CERTIFICATE OF CORRECTION

PATENT NO.        : 11,039,429 B2  
APPLICATION NO.   : 16/216191  
DATED             : June 15, 2021  
INVENTOR(S)       : Abdoli et al.

Page 1 of 1

It is certified that error appears in the above-identified patent and that said Letters Patent is hereby corrected as shown below:

In the Claims

In Claim 12, Column 33; Line 44 delete "0" insert --"0"--

In Claim 18, Column 34; Line 47 delete "0" insert --"0"--

Signed and Sealed this  
Seventh Day of September, 2021

Drew Hirshfeld  
*Performing the Functions and Duties of the*  
*Under Secretary of Commerce for Intellectual Property and*  
*Director of the United States Patent and Trademark Office*